United States Patent [19]
Kuba

[11] Patent Number: 5,661,604
[45] Date of Patent: Aug. 26, 1997

[54] IMAGE DISPLAY APPARATUS

[75] Inventor: Keiichi Kuba, Hachiojo, Japan

[73] Assignee: Olympus Optical Co., Ltd., Tokyo, Japan

[21] Appl. No.: 361,225

[22] Filed: Dec. 21, 1994

[30] Foreign Application Priority Data

Dec. 22, 1993 [JP] Japan .................... 5-323820

[51] Int. Cl.$^6$ .................................... G02B 27/14
[52] U.S. Cl. .......................... 359/637; 359/633
[58] Field of Search ...................... 359/633, 637, 359/636

[56] References Cited

U.S. PATENT DOCUMENTS 4,269,476 5/1981 Gauthier et al. .
5,303,221 4/1994 Maeda et al. .................. 369/112

FOREIGN PATENT DOCUMENTS 3-191389 8/1991 Japan .
6-27409 2/1994 Japan .

OTHER PUBLICATIONS

Chapters VI and VII of "Small Sized Optical Elements For Optical Designers", published by Optics, Inc., pp. 88–121.
New Methods of Designing Holographic Optical Elements, William C. Sweatt SPIE vol. 126 Clever Optics (1977) pp. 46–53.

*Primary Examiner*—Georgia Y. Epps
*Assistant Examiner*—Thomas Robbins
*Attorney, Agent, or Firm*—Cushman, Darby & cushman IP Group of Pillsbury Madison & Sutro LLP

[57] ABSTRACT

A compact, lightweight and wide-field head-mounted image display apparatus which is effectively corrected for chromatic aberration. The apparatus includes an image display device (1) for displaying an image, a concave mirror (2) provided to face the image display device (1) to project the displayed image into an eyeball pupil (E) as an enlarged image, and a half-mirror (3) disposed between the image display device (1) and the concave mirror (2). A diffraction optical element (20) having reciprocal dispersion characteristics is disposed somewhere in the optical path to correct chromatic aberration.

20 Claims, 28 Drawing Sheets

IMAGE DISPLAY APPARATUS

BACKGROUND OF THE INVENTION

1. Field of the Invention

The present invention relates to an image display apparatus and, more particularly, to a compact head- or face-mounted image display apparatus which is retained on the user's head or face to project an image into his or her eyeball.

2. Background of Related Art

In recent years, helmet- and goggle-type head- or face-mounted image display apparatuses, which are designed to be retained on the user's head or face, have been developed for the purpose of enabling the user to enjoy virtual reality or a wide-screen personally.

For example, Japanese Patent Application Laid-Open (KOKAI) No. 3-191389 (1991) discloses an optical system including, as shown in FIG. 39, a two-dimensional display device 1 for displaying an image, a concave mirror 2 provided to face the display device 1 to project the displayed image into an observer's eyeball 4 as an enlarged image, and a half-mirror 3 disposed between the display device 1 and the concave mirror 2, thereby enabling the optical system to be arranged in a compact structure while maintaining favorable image forming performance. In U.S. Pat. No. 4,269,476, as shown in FIG. 40, a beam splitter prism 5 having a half-mirror is used in place of the above-described half-mirror.

There are two methods of widening the field of view of conventional ocular optical systems such as those shown in FIGS. 39 and 40: ① one in which the size of the two-dimensional display device 1 is increased; and ② the other in which the focal length f of the optical system is reduced.

With the method ①, however, not only the two-dimensional display device but also the half-mirror or the prism increase in size. Accordingly, the apparatus increases in both overall size and weight, which is unfavorable for a head-mounted image display apparatus. Further, when the apparatus is designed for observation with both eyes, the achievement of a wider field of view is limited because of interference between two optical systems for both eyes, which are composed of the above-described elements.

When the method ② is employed to widen the field of view of an optical system arranged as shown in FIG. 39, the field curvature (negative Petzval sum) and positive comatic aberration produced by the concave mirror increase, giving rise to a problem. To solve the problem, if a Mangin mirror is used in place of the concave mirror so as to increase the capability of correcting aberrations such as field curvature and coma and to improve the durability of the mirror, chromatic aberration is produced by the refracting lens.

If a doublet 8 is used as a refracting lens, as shown in FIG. 41, chromatic aberration can be corrected, but the overall weight of the apparatus increases, which is unfavorable for a head-mounted image display apparatus. That is, to correct chromatic aberration effectively, the doublet 8 is composed, for example, of a concave lens made of a flint glass material, and a convex lens made of a crown glass material. Therefore, the weight of the constituent lens elements, particularly the weight of the concave lens, is heavy.

The method ② further involves the following problem: If the focal length of the optical system is reduced with the size of the two-dimensional display device maintained at a constant level, the spacing between the eyeball 4 and the half-mirror 3 (i.e., the working distance of the optical system) reduces, so that it becomes difficult for the user to use the apparatus with his or her glasses on. Further, there is a limit to the achievement of a wider field of view.

One approach to widen the field of view without increasing the size of the optical system to a considerable extent is to dispose a surface having a positive refractive power or a positive lens between the eyeball and the half-mirror. In this case, however, it is necessary to correct chromatic aberration produced by the surface having a positive refractive power or the positive lens, which is disposed between the eyeball and the half-mirror.

FIG. 42 illustrates an optical ray trace of one example of the above-described optical system. The illustrated optical system uses a prism 5 to increase the spacing between the pupil E of the eyeball 4 and the half-mirror 3 and employs an aspherical surface as a surface 7 of the prism 5 on the side thereof which is closer to the image display device 1 in order to correct distortion, which increases as the field of view is widened, and to ensure the required telecentric properties.

The optical system having the above-described arrangement provides a wide field of view, i.e., 40°×30°, and yet it is compact and exhibits favorable performance. However, since the doublet 8 composed of glass lenses is provided in the vicinity of the reflecting mirror in order to correct chromatic aberration, the overall weight of the apparatus increases to a considerable extent, as described above, even if the prism 5 is made of a plastic material to suppress the increase of the weight.

In any case, if it is intended to form an achromatic optical system using glass lenses, the weight increases considerably, as described above. Therefore, it is very important to reduce the weight of the apparatus.

SUMMARY OF THE INVENTION

In view of the above-described problems of the conventional techniques, an object of the present invention is to provide a compact, lightweight and wide-field head-mounted image display apparatus which is effectively corrected for chromatic aberration.

To attain the above-described object, the present invention provides an image display apparatus having a device for displaying an image, and a projection optical system for leading the displayed image to an observation region. The projection optical system includes a semitransparent reflecting member which is disposed on an optical path of the image display device as an optical axis bending device, a reflecting member which is disposed so as to form a turn-back optical path between it and the semitransparent reflecting member, a member having refractive power, and a diffraction optical element. At least either the member having refractive power or the diffraction optical element is disposed in an optical path between the semitransparent reflecting member and the observation region, which includes the turn-back optical path.

In addition, the present invention provides an image display apparatus having a device for displaying an image, and a projection optical system for leading the displayed image to an observation region. The projection optical system has a semitransparent reflecting member which is disposed on an optical path of the image display device as an optical axis bending device, a reflecting member which is disposed so as to form a turn-back optical path between it and the semitransparent reflecting member, and a combination of a member having refractive power and a diffraction optical element, which are disposed in an optical path between the semitransparent reflecting member and the observation region, which includes the turn-back optical path.

In the above-described arrangements, the member having refractive power and the diffraction optical element are preferably formed so that at least a part of chromatic aberration produced by one of them is canceled by the other. It is particularly preferable that the member having refractive power should be arranged to produce at least positive chromatic aberration, and that the diffraction optical element should be arranged to produce at least negative chromatic aberration.

As the semitransparent reflecting member, a half-mirror, a prism, a polarization beam splitter, etc. may be employed. As the reflecting member, a plane mirror, a concave mirror, etc. may be employed. As the member having refractive power, a lens surface, a positive lens, a doublet lens, etc. may be employed.

It should be noted that, when a prism is employed as the semitransparent reflecting member, the member having refractive power may be a lens surface integrally provided with the prism.

The image display device and the reflecting member may be disposed so that optical axes of these elements extend approximately parallel to each other through the semitransparent reflecting member. Alternatively, the image display device and the reflecting member may be disposed so that optical axes of these elements intersect each other through the semitransparent reflecting member.

It should be noted that in the above-described arrangements the term "observation region" means an eye point.

More specifically, it is preferable to adopt either an arrangement in which a refracting surface of positive power or a positive refracting lens is disposed between an observer's eyeball and the optical axis bending device, and a diffraction optical element of positive power is disposed between the optical axis bending device and the reflecting member, or an arrangement in which an optical system composed of a member having refractive power and a diffraction optical element is disposed between the eyeball and the optical axis bending device.

In this case, it is preferable to satisfy the following condition:

$$0.033 < \Sigma(f/f_{DOE}) < 0.19 \quad (1)$$

where f is the focal length of the entire optical system for light of a given order of diffraction, $f_{DOE}$ is the focal length of the diffraction optical element for the light of a given order of diffraction, and $\Sigma$ means summation carried out in a case where there are a plurality of diffraction optical elements.

It is even more preferable that the focal length f of the entire optical system should satisfy the following condition:

$$15 < f < 60 \quad (2)$$

The diffraction optical element preferably has such aspherical action (pitch distribution) that the power becomes weaker than the power of a paraxial spherical system, as the distance from the optical axis increases.

The reason for adopting the above-described arrangements and the functions thereof will be explained below.

Diffraction optical elements (hereinafter referred to as "DOE"), represented by zone plates, have high reciprocal dispersion characteristics (i.e., negative chromatic characteristics), i.e., Abbe's number $vd=-3.45$, and exhibit powerful chromatic aberration correction capability. Accordingly, DOE can effectively correct chromatic aberration occurring as a result of achievement of a wider field of view, as described above with regard to the problems of the conventional techniques.

Further, since a DOE having aspherical action can be produced by the same method as that for a DOE having spherical action, it is possible to positively give aspherical action to the DOE and hence possible to effectively correct off-axis aberration increased as a result of achievement of a wider field of view. In this case, if the DOE is given such aspherical action (pitch distribution) that the power becomes weaker than the power of a paraxial spherical system as the distance from the optical axis increases, the aberration correction capability increases. Further, with such pitch arrangement, the pitch at the periphery of the clear aperture region of the DOE becomes relatively large, so that the productivity of the DOE also improves. In addition, unlike a refracting lens, a DOE can be produced simply by forming a diffraction surface on the surface of a substrate. Therefore, it is accompanied by practically no increase in volume or weight and hence favorable for use in an optical system of a head-mounted image display apparatus.

With a view to effectively widening the field of view of the optical system without causing an increase in size of it, it is preferable to dispose a surface of positive power or an element of positive power between the eyeball and the optical axis bending device. In this case, the following three arrangements may be employed for construction of an effective achromatic optical system using a DOE:

① A refracting surface having a positive power or a positive refracting lens is disposed between the eyeball and the optical axis bending device, and a DOE of positive power is disposed between the optical axis bending device and the image display device, preferably in the vicinity of the reflecting mirror.

② An achromatic optical system having a positive power as a whole, which is composed of a refracting system and a DOE, is disposed between the eyeball and the optical axis bending device.

③ A DOE having a positive power is disposed between the eyeball and the optical axis bending device, and a refracting surface of positive power or a positive refracting lens is disposed between the optical axis bending device and the image display device, preferably in the vicinity of the reflecting mirror.

Conditions of chromatic aberration correction made in the above optical systems ① to ③ will be shown in Table 1 below.

TABLE 1

Chromatic Aberration Produced in Each Optical System

| | | Optical system between eyeball and optical axis bending device | Optical system between optical axis bending device and image display device | Total |
|---|---|---|---|---|
| ① | Axial chromatic aberration | positive | negative | none |
| | Lateral chromatic aberration | positive | negative | positive |
| ② | Axial chromatic aberration | none | none | none |
| | Lateral chromatic aberration | none | none | none |
| ③ | Axial | negative | positive | none |

TABLE 1-continued

Chromatic Aberration Produced in Each Optical System

|  | Optical system between eyeball and optical axis bending device | Optical system between optical axis bending device and image display device | Total |
|---|---|---|---|
| chromatic aberration Lateral chromatic aberration | negative | positive | negative |

As shown in Table 1, the arrangements ① to ③ make it possible to prevent an increase in size of the optical system and enable an achromatic optical system to be effectively formed using a combination of a refracting system and a DOE.

If the optical axis bending device is formed by using a prism, it becomes favorably easy to ensure the required working distance and wide field of view. Table 2 below shows the conditions of chromatic aberration correction made in the above optical systems ① to ③.

TABLE 2

Chromatic Aberration Produced in Each Optical System When Prism is Used

|  | Optical system between eyeball and optical axis bending device | Optical system between optical axis bending device and image display device | Prism exit end surface | Total |
|---|---|---|---|---|
| ① Axial chromatic aberration | positive | negative | negative | none |
| Lateral chromatic aberration | positive | negative | none | none |
| ② Axial chromatic aberration | none | none | negative | negative (small) |
| Lateral chromatic aberration | none | none | none | none |
| ③ Axial chromatic aberration | positive | negative | negative | negative (large) |
| Lateral chromatic aberration | positive | negative | none | negative |

In this case, the arrangement ③ cannot simultaneously correct both axial and lateral chromatic aberrations; therefore, the arrangement ① or ② is preferable.

In the optical system having the arrangement ①, positive chromatic aberration is produced by the refracting surface having a positive power or positive refracting lens, which is disposed between the eyeball and the optical axis bending device, while negative chromatic aberration is produced by the optical system including a DOE, which is disposed in the vicinity of the reflecting mirror, and negative chromatic aberration is produced by the end surface (exit surface) of the prism on the side thereof which is closer to the image display device. Therefore, both the axial and lateral chromatic aberrations are effectively corrected.

Further, in this case, there is a large difference between the position of a bundle of axial rays and the position of a bundle of off-axis rays at the DOE. Accordingly, the DOE is useful not only to correct spherical aberration and axial chromatic aberration but also to correct off-axis aberrations, e.g., distortion and astigmatism, and to ensure telecentric properties for the display device side.

Further, with a view to minimizing chromatic aberration in the entire optical system, it is preferable to reduce the dispersion of the prism used as the optical axis bending device. If the dispersion of the prism is small, the power of the DOE for correcting chromatic aberration in the refracting system can be reduced. Consequently, the secondary spectrum in the entire optical system reduces, and hence the achromatic characteristics further improve. In addition, the pitch of the DOE increases, which is favorable from a manufacturing point of view.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 20 of the optical system of the head-mounted image display apparatus according to the present invention will be described below with reference to the accompanying drawings.

First, a method of designing an optical system including a DOE used in the present invention will be explained.

The principle of a DOE, which is an optical element based on a diffractive phenomenon, is detailed, for example, in Chapters VI and VII of "Small-Sized Optical Elements for Optical Designers" (Optronics). Let us explain it briefly.

Figure 1:
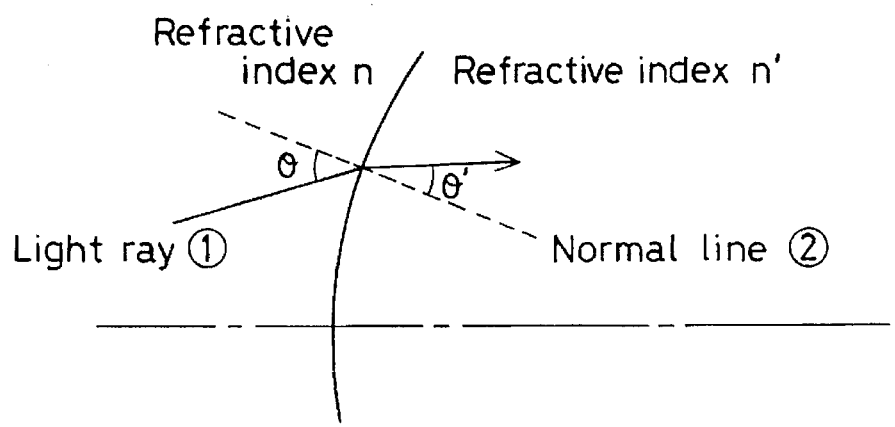
FIG. 1 shows the principle of refraction to explain a diffraction optical element used in the present invention.
Figure 2:
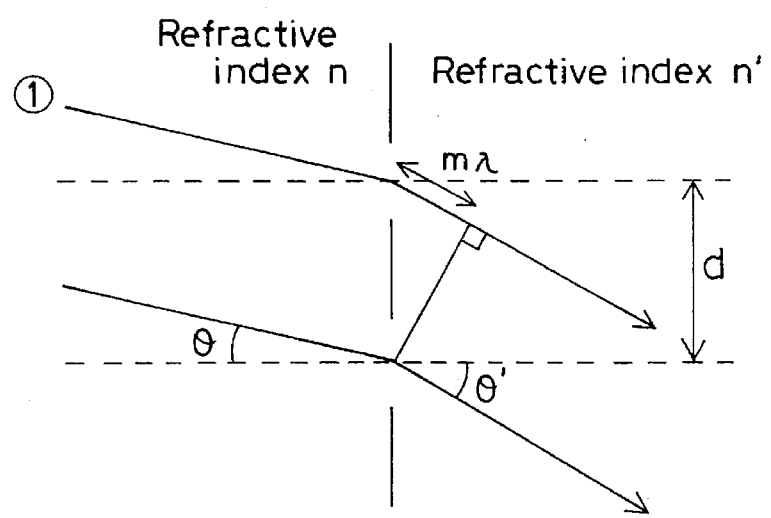
FIG. 2 shows the principle of diffraction to explain a diffraction optical element used in the present invention.

In the case of an optical element based on a refractive phenomenon, a light ray ① is bent, as shown in FIG. 1, on the basis of Snell's law given by $$n \cdot \sin \theta = n' \cdot \sin \theta' \qquad (3)$$

where $n$: the refractive index of the incident-side medium
$n'$: the refractive index of the exit-side medium
$\theta$: the angle of incidence of the ray
$\theta'$: the exit angle of the ray On the other hand, in the case of a DOE, a light ray ① is bent, as shown in FIG. 2, by a diffractive phenomenon expressed by $$n \cdot \sin \theta - n' \cdot \sin \theta' = m\lambda/d \qquad (4)$$

where $n$: the refractive index of the incident-side medium
$n'$: the refractive index of the exit-side medium
$\theta$: the angle of incidence of the ray
$\theta'$: the exit angle of the ray
$m$: the order of diffraction
$\lambda$: the wavelength
$d$: the pitch of the DOE It should be noted that if the DOE is blazed or approximately blazed, high diffraction efficiency can be maintained.

As a technique of designing an optical system including a DOE, Sweatt model is known; this is detailed in W. C. Sweatt "NEW METHODS OF DESIGNING HOLOGRAPHIC OPTICAL ELEMENTS", SPIE, Vol. 126, pp. 46–53 (1977). The Sweatt model will be briefly explained below with reference to FIG. 3.

Figure 3:
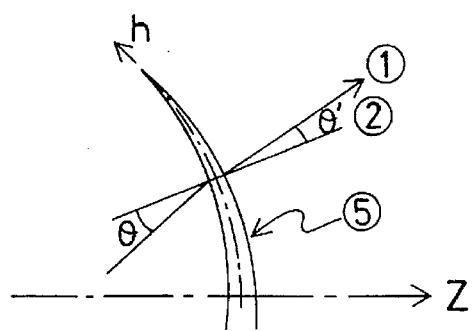
FIG. 3 is a view for explanation of an ultra-high index lens.

In FIG. 3, reference numeral ⑤ denotes a refracting lens (ultra-high index lens) in which $n \gg 1$, and ② a normal line. Reference symbol z denotes coordinates in the direction of an optical axis, and h denotes coordinates in the direction lying along the substrate.

According to the above-mentioned paper, the following equation holds:

$$(n_u-1)dz/dh = n \cdot \sin \theta - n' \cdot \sin \theta' \qquad (5)$$

where $n_u$: the refractive index of the ultra-high index lens ($n_u = 10001$ in the design explained below)
$z$: the coordinates in the optical axis direction of the ultra-high index lens
$h$: the coordinates along the medium of the ultra-high index lens
$n$: the refractive index of the incident-side medium
$n'$: the refractive index of the exit-side medium
$\theta$: the angle of incidence of the ray
$\theta'$: the exit angle of the ray Therefore, the following equation holds from Eqs. (4) and (5):

$$(n_u-1)dz/dh = m\lambda/d \qquad (6)$$

That is, the equivalent relationship expressed by Eq. (6) is established between "the surface configuration of the refracting lens in which $n \gg 1$" and "the pitch of the DOE". Accordingly, the pitch distribution on the DOE can be obtained from the surface configuration of the ultra-high index lens designed on the basis of the Sweatt model.

More specifically, let us assume that the ultra-high index lens is designed as an aspherical lens defined by $$z = ch^2/\{1+[1-c^2(k+1)h^2]^{1/2}\} + Ah^4 + Bh^6 + Ch^8 + Dh^{10} \qquad (7)$$

where z: the displacement (sag value) from a plane tangent to the lens at the optical axis c: the curvature h: the distance from the optical axis k: the conical constant A: the 4th-order aspherical coefficient B: the 6th-order aspherical coefficient C: the 8th-order aspherical coefficient D: the 10th-order aspherical coefficient Assuming that one surface of the ultra-high index lens is a plane surface for simplification of the explanation, the following equation is obtained from Eqs. (6) and (7), $$d = m\lambda/(n-1)dz/dh] = [m\lambda/(n-1)] \times [ch/[1-c^2(k+1) h^2]^{1/2} + 4Ah^3 + 6Bh^5 + 8Ch^7 + 10Dh^9]^{-1} \quad (8)$$

Thus, the DOE should be given a pitch distribution defined by Eq. (8). It should be noted that in the following examples pitches are calculated for the wavelength $\lambda$=e-line by using the spectral e-line as a reference wavelength.

Further, it is necessary for Eq. (6) to hold for any desired wavelength.

$$\therefore n(\lambda) - 1 = K\lambda \quad (9)$$

where K=m/[d·dz/dh]

Since $n_d$ is herein assumed to be 1001, K=1.7020.

Thus, the dispersion characteristics of the DOE can be expressed according to Eq. (9) by assuming that $n_C$=1118.0, $N_e$=930.39, $n_F$=828.37 and $n_g$=742.78.

Although in the following examples aspherical surface terms for only 4th- to 10th-orders are used, it should be noted that aspherical surface terms for 12th-, 14th- orders may be used, as a matter of course.

Although in most of the following examples the refracting lens can be treated as a spherical lens, it is even more preferable to use an aspherical lens as the refracting lens, as a matter of course.

Although the following examples use only one DOE, two or more DOEs may be used, as a matter of course.

Ray tracing carried out in the following examples is backward tracing in which rays are traced from the eyeball side toward the image display device, which is defined as the image point.

It will be understood from Eq. (8) that as the order m of diffraction is increased, the pitch increases, and the production of the DOE becomes easier. In the following examples, however, m is defined as m=+1 for simplification of the explanation.

It should also be noted that the spectral e-line is used as a reference wavelength, and that the values of the focal length and other factors are those for the e-line.

First Example

Figure 4:
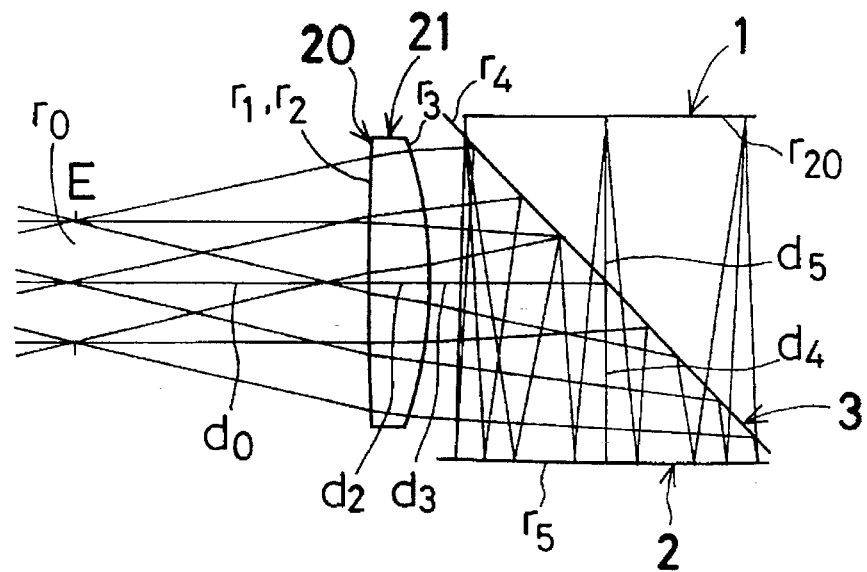
FIG. 4 is a sectional view of a lens system in a first example of the present invention.

FIG. 4 is a sectional view showing the lens system of a first example of the present invention. In FIG. 4, reference symbol E denotes the pupil position of an observer's eyeball. Reference numeral 1 denotes an image display device, 2 a concave mirror, 3 a half-mirror, and 20 a DOE (diffraction surface). In this example, a lens 21 one side of which is the diffraction surface 20 and which has a positive refractive power as a whole is disposed between the eyeball and the half-mirror 3. The use of the lens 21 having a positive power action enables achievement of a wide field of view without increasing the overall size of the optical system.

Figure 24:
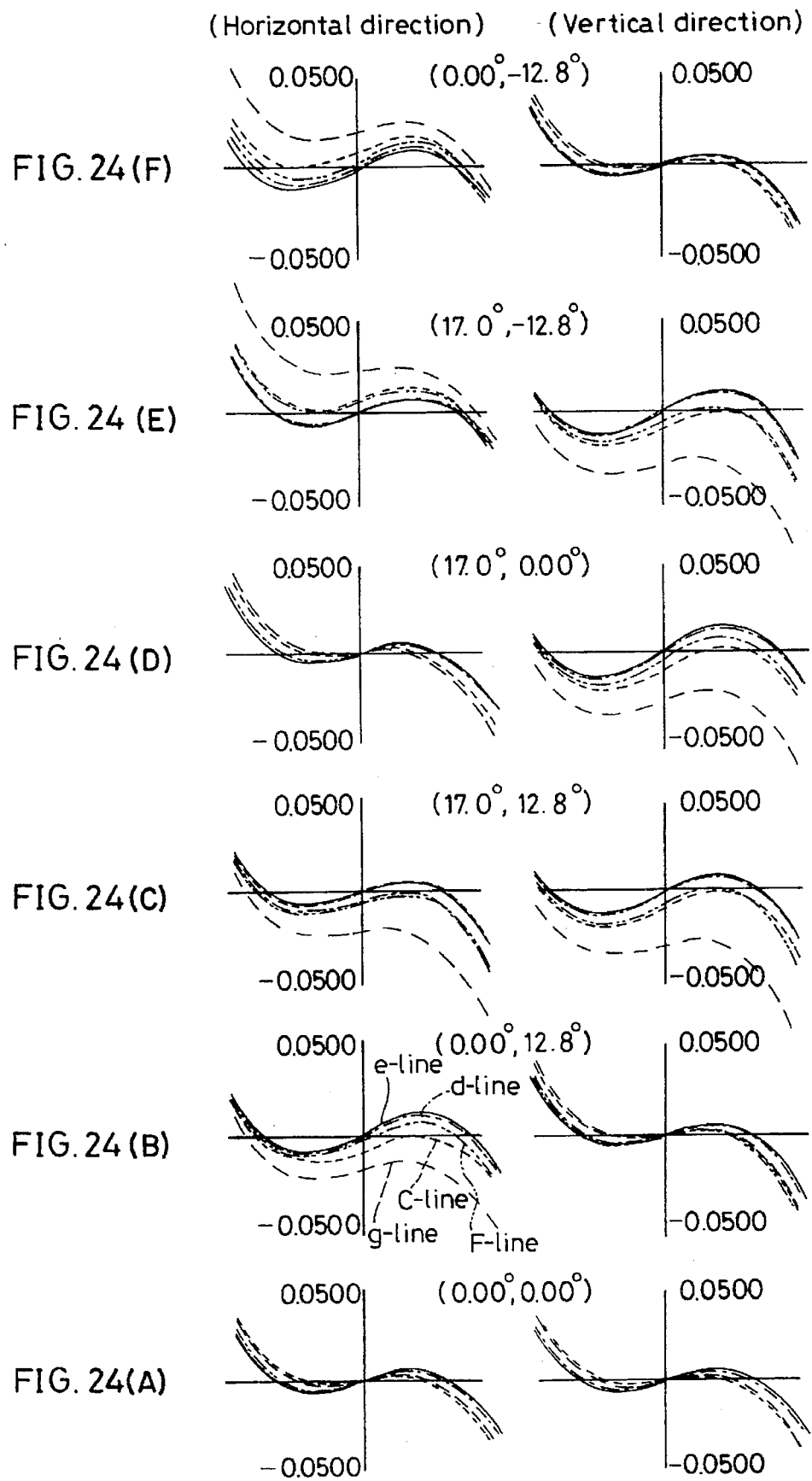
FIGS. 24(A) to 24(F) graphically show lateral aberration in the first example.

FIGS. 24(A) to 24(F) graphically show lateral aberration in the horizontal and vertical directions in this example at various angles to the image field: FIG. 24(A) shows aberration values in the direction of the visual axis (0° in the horizontal direction and 0° in the vertical direction); FIG. 24(B) shows aberration values at 0° in the horizontal direction and 12.8° in the vertical direction; FIG. 24(C) shows aberration values at 17° in the horizontal direction and 12.8° in the vertical direction; FIG. 24(D) shows aberration values at 17° in the horizontal direction and 0° in the vertical direction; FIG. 24(E) shows aberration values at 17° in the horizontal direction and −12.8° in the vertical direction; and FIG. 24(F) shows aberration values at 0° in the horizontal direction and −12.8° in the vertical direction.

It should be noted that in numerical data (described later) for this example, the 1-st surface is an aspherical surface, and the aspherical configuration is defined by Eq. (7). In addition, the 2-nd surface is a surface of a substrate on which the DOE 20 is formed. The 1-st and 2-nd surfaces define an ultra-high index lens equivalent to the DOE 20.

Since the Petzval sum of the lens 21 is positive, it corrects the negative Petzval sum of the concave mirror 2, thereby enabling the field curvature to be effectively corrected. If the lens 21 is formed by using only a refracting lens, the Petzval sum is likely to be over-corrected. However, since the DOE 20 is equivalent to a refracting lens having an infinite refractive index, it produces no Petzval sum, and thus the lens 21 prevents the Petzval sum from being over-corrected to a considerable extent.

In addition, the DOE 20 corrects positive chromatic aberration produced in the refracting lens by its reciprocal dispersion action. As a result, the optical system in this example is effectively corrected for chromatic aberration to become an achromatic (dichromatic) optical system, as shown in FIGS. 24(A) to 24(F).

In a case where no chromatic aberration is produced at the back of the optical axis bending device as in this example, the lens system in front of the optical axis bending device needs to be an achromatic lens system.

Let us assume that the focal lengths of the refracting lens and the DOE are $f_{ref}$ and $f_{DOE}$, respectively, and the Abbe's numbers of the refracting lens and the DOE are $v_{ref}$ and $v_{DOE}$ (=−3.45), respectively. Since the Abbe's number of the refracting lens made of a glass or plastic material is $15 < v_{ref} < 100$, it is necessary to satisfy the following condition for a composite optical system composed of a refracting lens and a DOE and having a focal length f as a whole to become an axial achromatic optical system:

$$0.033 < f/f_{DOE} < 0.19 \quad (10)$$

If $f/f_{DOE}$ is not larger than the lower limit of the condition (10), i.e., 0.033, the chromatic aberration is under-corrected, so that positive chromatic aberration deteriorates the performance. If $f/f_{DOE}$ is not smaller than the upper limit of the condition (10), i.e., 0.19, the chromatic aberration is over-corrected, so that negative chromatic aberration and a large secondary spectrum deteriorate the performance.

It is even more preferable to satisfy the following condition:

$$15 < f < 60 \quad (2)$$

If f is not larger than the lower limit of the condition (2), i.e., 15, the working distance of the optical system unfavorably reduces, whereas, if f is not smaller than the upper limit of the condition (2), i.e., 60, the optical system increases in size and weight, which is unfavorable.

In this example, $v_{ref}$=56.25; therefore, $f/f_{DOE}$=0.057 (f=44.03).

Since a DOE can be produced with a desired pitch arrangement, the DOE (ultra-high index lens) 20 is treated as an aspherical lens in this example. The aspherical action of the DOE 20 in this example causes the pitch at the periphery of the clear aperture region of the DOE 20 to become relatively large. With such a pitch arrangement in which, as the distance from the optical axis increases toward the periphery of the clear aperture region, the power becomes weaker (i.e., the pitch becomes larger) than the pitch in a pitch arrangement that is determined on a paraxial basis, the aberration correction capability increases, so that spherical and other aberrations can be effectively corrected. In addition, since the pitch at the periphery of the clear aperture region of the DOE 20 is prevented from becoming very small, the production of the DOE 20 is facilitated. In this example, the minimum pitch of the DOE 20 is 52 μm, which does not give rise to any rise to no production problem.

In the case of a DOE, undesired diffracted light other than light of desired-order of diffraction may be produced on account of production error. To space the image surface of undesired diffracted light satisfactorily away from the image surface of light of desired-order of diffraction, the pitch of the DOE should be reduced, or the DOE should be disposed at a position where the marginal beam diameter is relatively large. In this example, the DOE 20 is disposed where the marginal beam diameter is relatively large. Therefore, the chromatic aberration can be effectively corrected, and the influence of undesired diffracted light can be effectively eliminated.

The image display apparatus may be provided with a function that enables observation of the outside world in addition to the image of the image display device 1. That is, a surface having a negative power or a negative lens is additionally provided at the side of the optical axis bending device 3 which is remote from the eyeball, and "the optical system composed of the lens 21 and a negative lens" is arranged to become an afocal optical system. In addition, a shutter device is provided in front of the surface or lens having a negative power. Thus, it becomes possible to observe an outside world image in addition to the image displayed by the image display device 1.

Second Example

Figure 5:
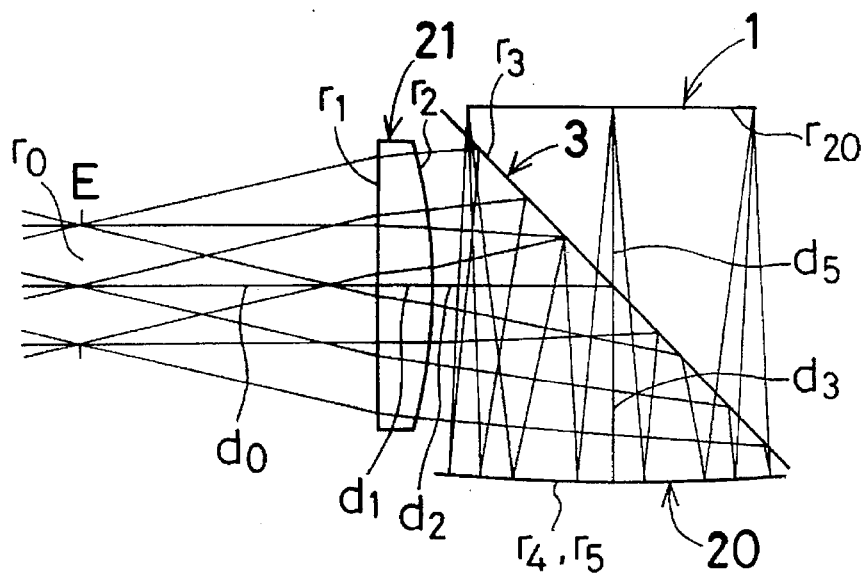
FIG. 5 is a sectional view of a lens system in a second example of the present invention.

FIG. 5 is a sectional view showing the lens system of a second example of the present invention. In FIG. 5, reference symbol E denotes the pupil position of an observer's eyeball. Reference numeral 1 denotes an image display device, 3 a half-mirror, 20 a DOE (diffraction surface), and 21 a lens having a positive refractive power. In this example, a diffraction surface is formed on the surface of a reflecting mirror (i.e., reflective DOE).

Figure 25:
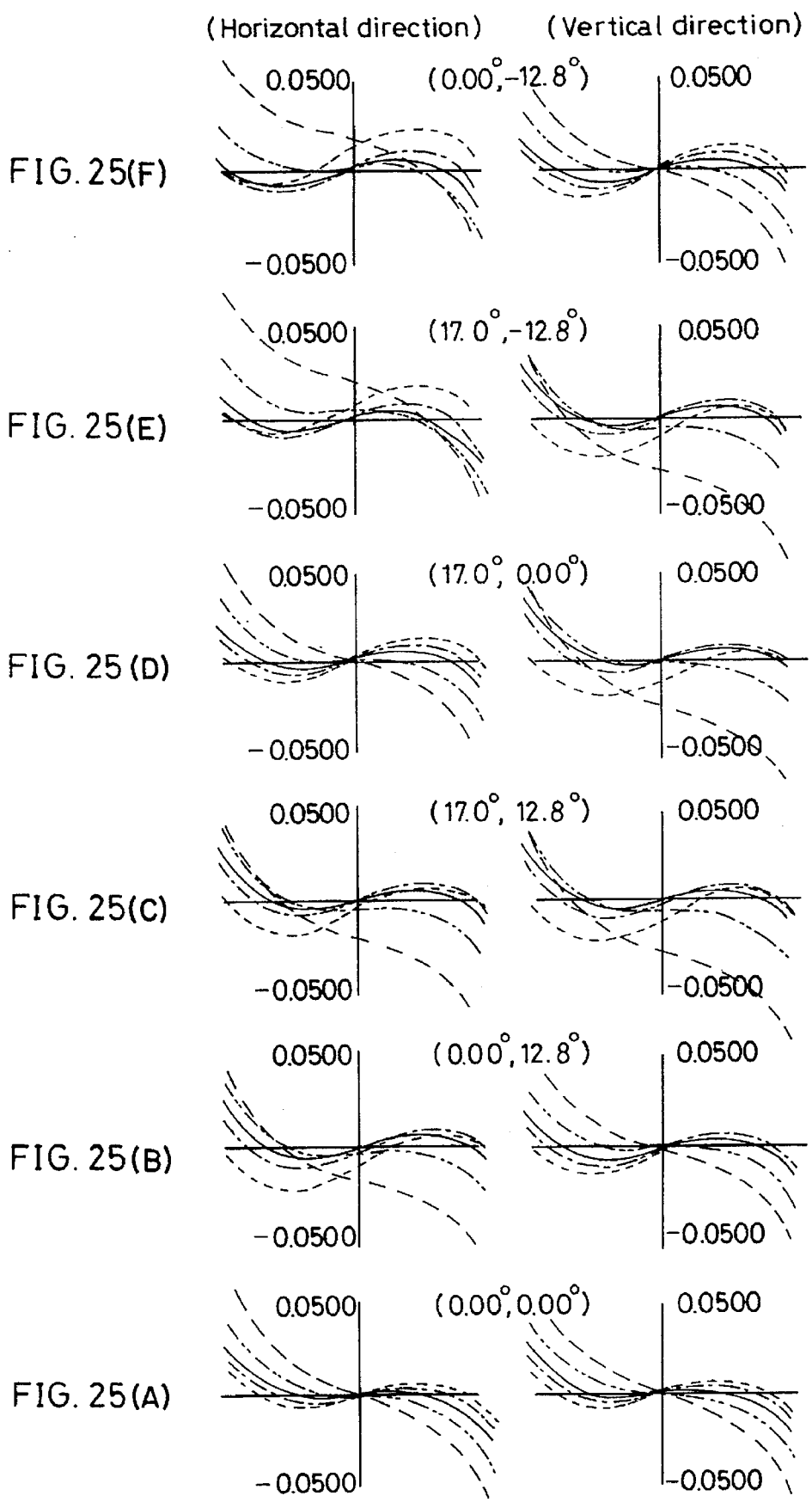
FIGS. 25(A) to 25(F) graphically show lateral aberration in the second example.

FIGS. 25(A) to 25(F) graphically show lateral aberration in the horizontal and vertical directions in this example at various angles to the image field: FIG. 25(A) shows aberration values in the direction of the visual axis (0° in the horizontal direction and 0° in the vertical direction); FIG. 25(B) shows aberration values at 0° in the horizontal direction and 12.8° in the vertical direction; FIG. 25(C) shows aberration values at 17° in the horizontal direction and 12.8° in the vertical direction; FIG. 25(D) shows aberration values at 17° in the horizontal direction and 0° in the vertical direction; FIG. 25(E) shows aberration values at 17° in the horizontal direction and −12.8° in the vertical direction; and FIG. 25(F) shows aberration values at 0° in the horizontal direction and −12.8° in the vertical direction.

It should be noted that in numerical data (described later) for this example, the 4-th surface is an aspherical surface, and the aspherical configuration is defined by Eq. (7). In addition, the 5-th surface is a surface (reflecting surface) of a substrate on which the DOE 20 is formed. The 4-th and 5-th surfaces define an ultra-high index lens equivalent to the DOE 20.

In this example, positive chromatic aberration produced in the lens 21, which lies in front of the optical axis bending device 3, is effectively corrected by the DOE 20, which lies at the back of the optical axis bending device 3. Assuming that the focal length of the entire composite optical system is f, since the spacing between the lens 21 and the DOE 20 is approximately f/2, the following equation must hold for the composite optical system to become achromatic.

$$v_{ref}f^2/2 + (v_{DOE} - v_{ref})f_{DOE}f - v_{DOE}f_{DOE}^2 = 0 \tag{11}$$

Assuming that $15 < v_{ref} < 100$, $$0.033 < f/f_{DOE} < 0.18 \tag{12}$$

Thus, the result is approximately the same as Eq. (10).

In this example, $f/f_{DOE} = 0.06$, which satisfies the condition (12). With regard to the focal length, $f = 44.65$, which satisfies the condition (2).

In this example, the DOE 20 is disposed where there is a large difference between the position of a bundle of axial rays and the position of a bundle of off-axis rays. Therefore, the DOE 20 effectively corrects not only chromatic and spherical aberrations but also off-axis aberrations such as distortion and astigmatism.

The DOE 20 in this example also has a pitch arrangement in which, as the distance from the optical axis increases toward the periphery of the clear aperture region, the pitch becomes larger than the pitch in a pitch arrangement that is determined on a paraxial basis. This is a condition necessary for correcting negative distortion produced by the concave mirror.

Third Example

Figure 6:
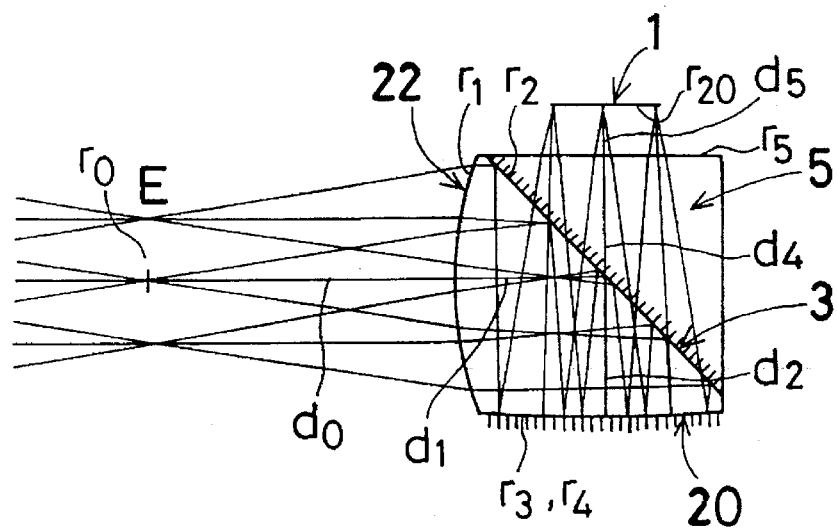
FIG. 6 is a sectional view of a lens system in a third example of the present invention.

FIG. 6 is a sectional view showing the lens system of a third example of the present invention. In FIG. 6, reference symbol E denotes the pupil position of an observer's eyeball. Reference numeral 1 denotes an image display device, 5 a beam splitter prism, 3 a half-mirror, 20 a DOE (diffraction surface), and 22 a beam splitter prism entrance surface (in backward tracing) having a positive refractive power. In this example also, a diffraction surface is formed on the surface of a reflecting mirror (i.e., reflective DOE). In this example, the beam splitter prism 5 is used as an optical axis bending device in order to obtain a longer working distance and a wider field of view. In addition, the eyeball-side surface 22 of the prism 5 is given a positive power to achieve a wide field of view without causing an increase in size of the prism 5.

Figure 26:
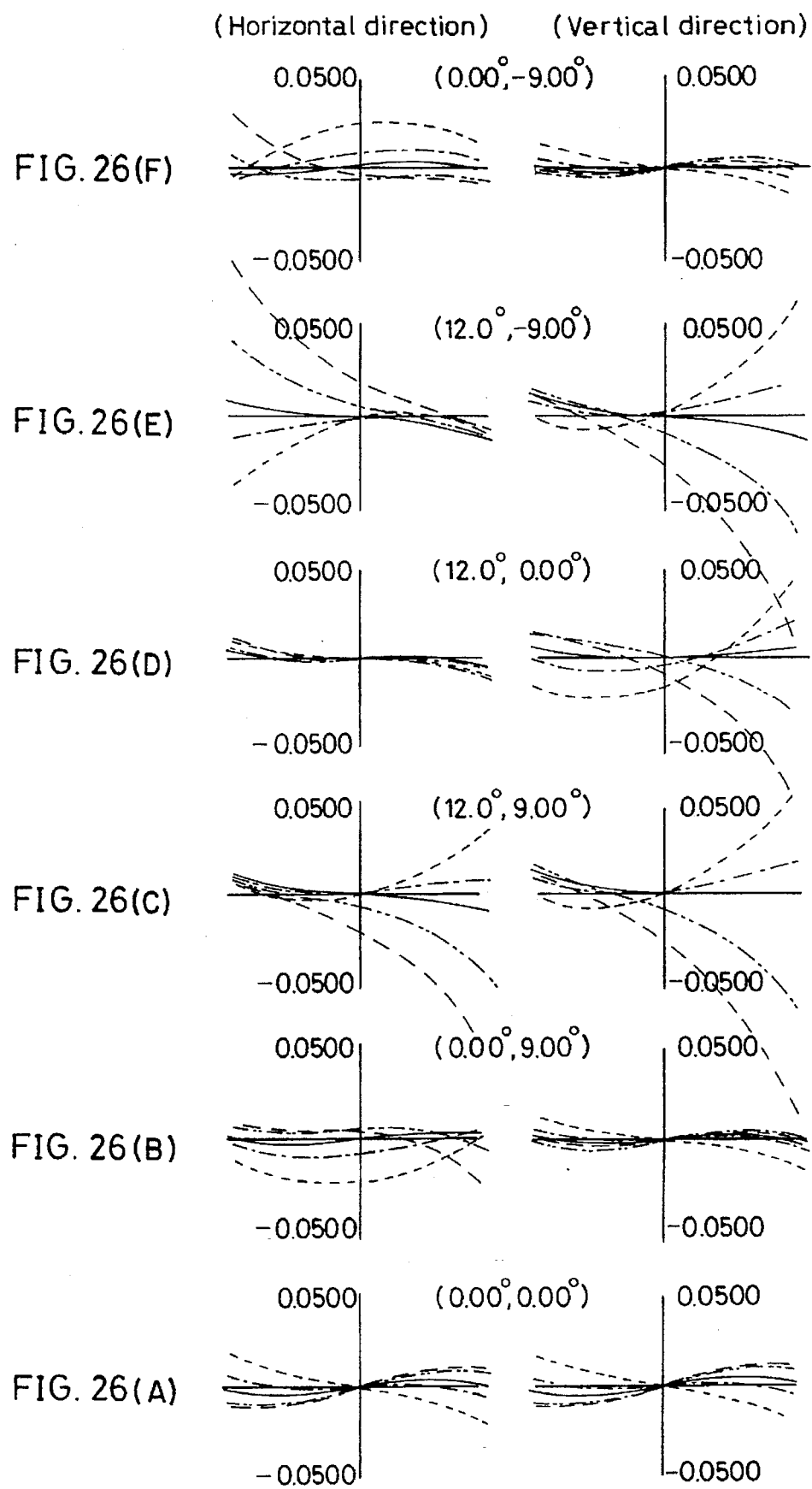
FIGS. 26(A) to 26(F) graphically show lateral aberration in the third example.

FIGS. 26(A) to 26(F) graphically show lateral aberration in the horizontal and vertical directions in this example at various angles to the image field: FIG. 26(A) shows aberration values in the direction of the visual axis (0° in the horizontal direction and 0° in the vertical direction); FIG. 26(B) shows aberration values at 0° in the horizontal direction and 9° in the vertical direction; FIG. 26(C) shows aberration values at 12° in the horizontal direction and 9° in the vertical direction; FIG. 26(D) shows aberration values at 12° in the horizontal direction and 0° in the vertical direction; FIG. 26(E) shows aberration values at 12° in the horizontal direction and −9° in the vertical direction; and FIG. 26(F) shows aberration values at 0° in the horizontal direction and −9° in the vertical direction.

It should be noted that in numerical data (described later) for this example, the 3-rd surface is an aspherical surface, and the aspherical configuration is defined by Eq. (7). In addition, the 4-th surface is a surface (reflecting surface) of a substrate on which the DOE 20 is formed. The 3-rd and 4-th surfaces define an ultra-high index lens equivalent to the DOE 20.

Unlike the second example, this example enables both axial and lateral chromatic aberrations to be corrected by properly setting the power of the DOE 20, although positive chromatic aberration is produced by the prism 5 because convergent light enters and emanates from the prism 5. It is necessary to make the power of the DOE 20 stronger than in the case of the second example in order to correct the positive chromatic aberration produced by the surface 22 of positive power and the positive chromatic aberration produced by the exit end surface of the prism 5.

In this example, $f/f_{DOE}$=0.1075, and f=20.90. Thus, the conditions (2) and (12) are satisfied.

If the dispersion of the prism 5 is reduced, chromatic aberration produced in the entire optical system, including secondary spectrum, can be reduced even more effectively. Therefore, it is preferable to minimize the dispersion of the prism 5.

In this example, the DOE 20 is disposed where there is a large difference between the position of a bundle of axial rays and the position of a bundle of off-axis rays. Therefore, the DOE 20 effectively corrects not only chromatic and spherical aberrations but also off-axis aberrations such as coma, astigmatism and distortion.

The DOE 20 in this example also has a pitch arrangement in which, as the distance from the optical axis increases toward the periphery of the clear aperture region, the pitch becomes larger than the pitch in a pitch arrangement that is determined on a paraxial basis. More specifically, the pitch gradually decreases in a region extending from the center of the clear aperture to a position corresponding to about 56% of the clear aperture. The pitch gradually increases in a region extending from the position corresponding to about 56% of the clear aperture to a position corresponding to 90% of the clear aperture. At the position corresponding to 90% of the clear aperture, the power becomes zero. Beyond the no-power portion, the power becomes negative, and the negative power gradually increases.

Fourth Example

Figure 7:
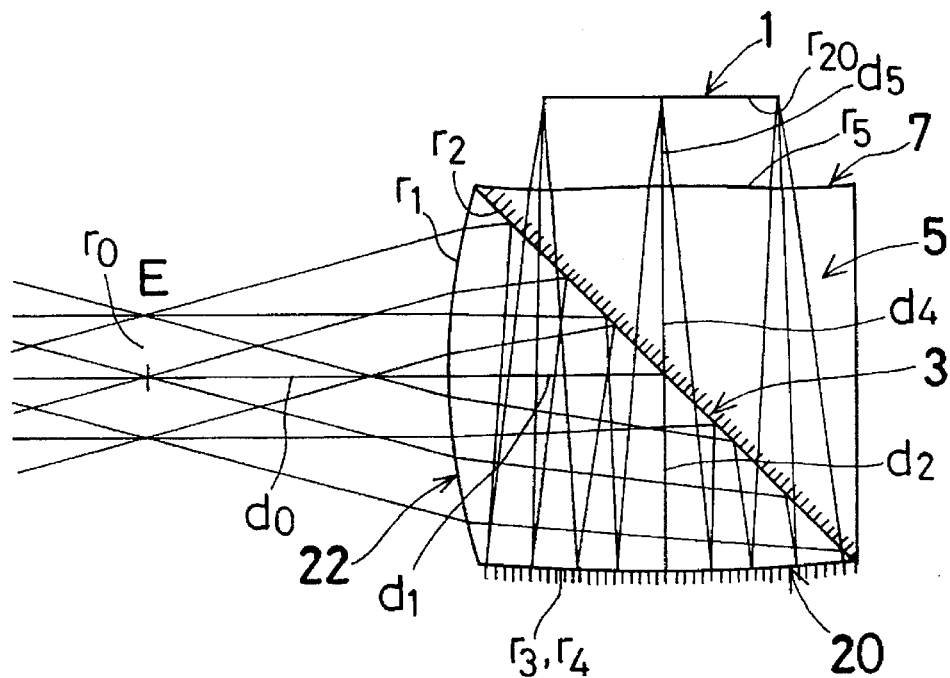
FIG. 7 is a sectional view of a lens system in a fourth example of the present invention.

FIG. 7 is a sectional view showing the lens system of a fourth example of the present invention. In FIG. 7, reference symbol E denotes the pupil position of an observer's eyeball. Reference numeral 1 denotes an image display device, 5 a beam splitter prism, 3 a half-mirror, 7 a beam splitter prism exit surface (in backward tracing), 20 a DOE (diffraction surface), and 22 a beam splitter prism entrance surface (in backward tracing) having a positive refractive power. This example differs from the third example in that the image display device-side surface 7 of the beam splitter prism 5 is formed into an aspherical surface to correct distortion and to ensure telecentric properties.

Figure 27:
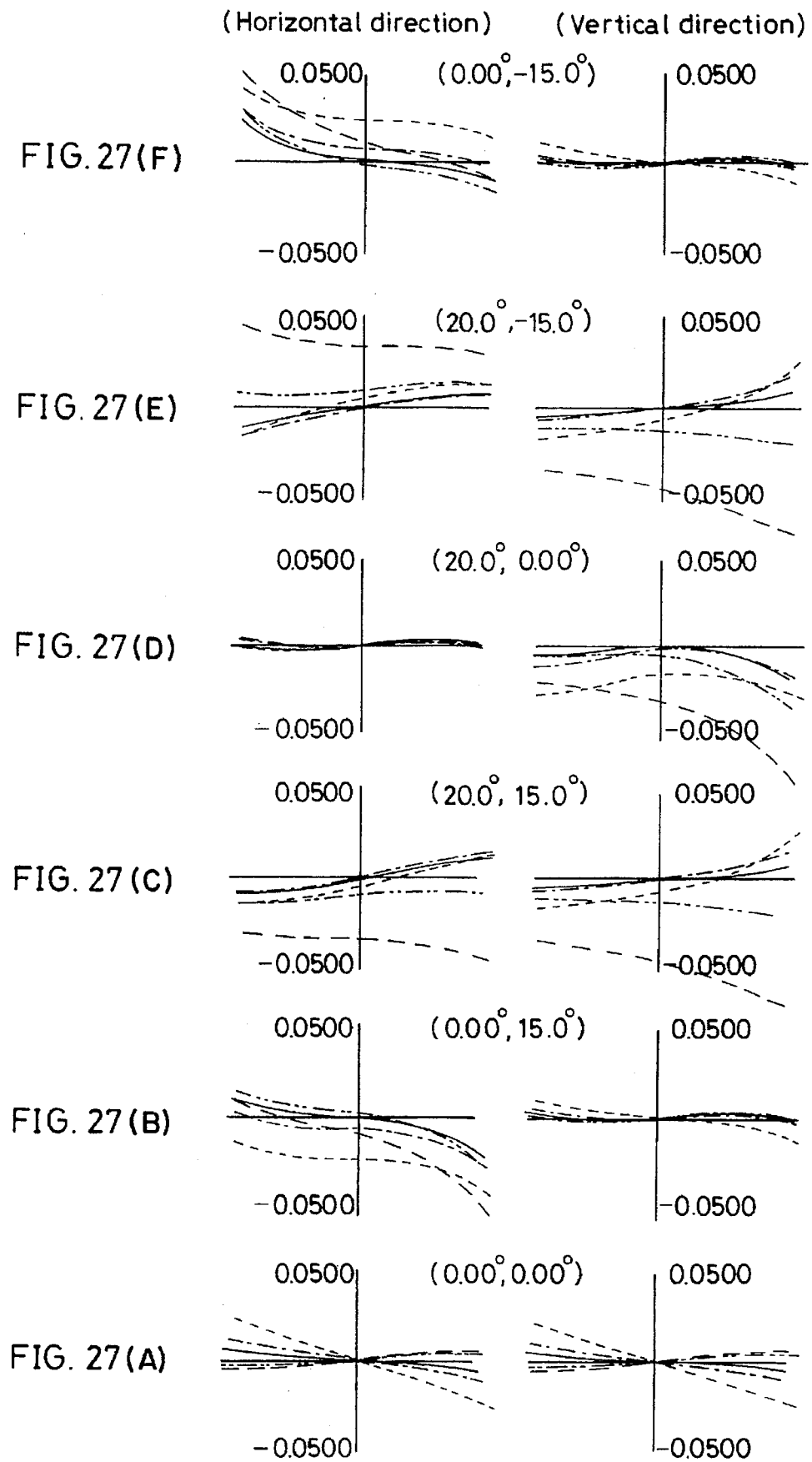
FIGS. 27(A) to 27(F) graphically show lateral aberration in the fourth example.

FIGS. 27(A) to 27(F) graphically show lateral aberration in the horizontal and vertical directions in this example at various angles to the image field: FIG. 27(A) shows aberration values in the direction of the visual axis (0° in the horizontal direction and 0° in the vertical direction); FIG. 27(B) shows aberration values at 0° in the horizontal direction and 15° in the vertical direction; FIG. 27(C) shows aberration values at 20° in the horizontal direction and 15° in the vertical direction; FIG. 27(D) shows aberration values at 20° in the horizontal direction and 0° in the vertical direction; FIG. 27(E) shows aberration values at 20° in the horizontal direction and −15° in the vertical direction; and FIG. 27(F) shows aberration values at 0° in the horizontal direction and −15° in the vertical direction.

It should be noted that in numerical data (described later) for this example, the 3-rd and 5-th surfaces are aspherical surfaces, and the aspherical configuration is defined by Eq. (7). In addition, the 4-th surface is a surface (reflecting surface) of a substrate on which the DOE 20 is formed. The 3-rd and 4-th surfaces define an ultra-high index lens equivalent to the DOE 20.

In this example, $f/f_{DOE}$=0.0740, and f=29.56. Thus, the conditions (2) and (12) are satisfied.

In this example, the aspherical surface 7 has no power in a paraxial region thereof. If the aspherical surface 7 is given paraxial power, chromatic aberration occurs. However, the surface 7 is close to the image surface, and the paraxial ray height is low. Therefore, the amount of chromatic aberration produced by the surface 7 is small. In this case also, the condition (12) can be substantially used as a substitute.

The DOE 20 in this example also has a pitch arrangement in which, as the distance from the optical axis increases toward the periphery of the clear aperture region, the pitch becomes larger than the pitch in a pitch arrangement that is determined on paraxial basis. More specifically, the pitch gradually decreases in a region extending from the center of the clear aperture to a position corresponding to 75% of the clear aperture, but the pitch gradually increases as the distance from the position corresponding to 75% of the clear aperture increases toward the outer side. In the case of a wide-field optical system, the aberration correction capability can be further increased by adopting the above-described pitch arrangement.

Figure 42:
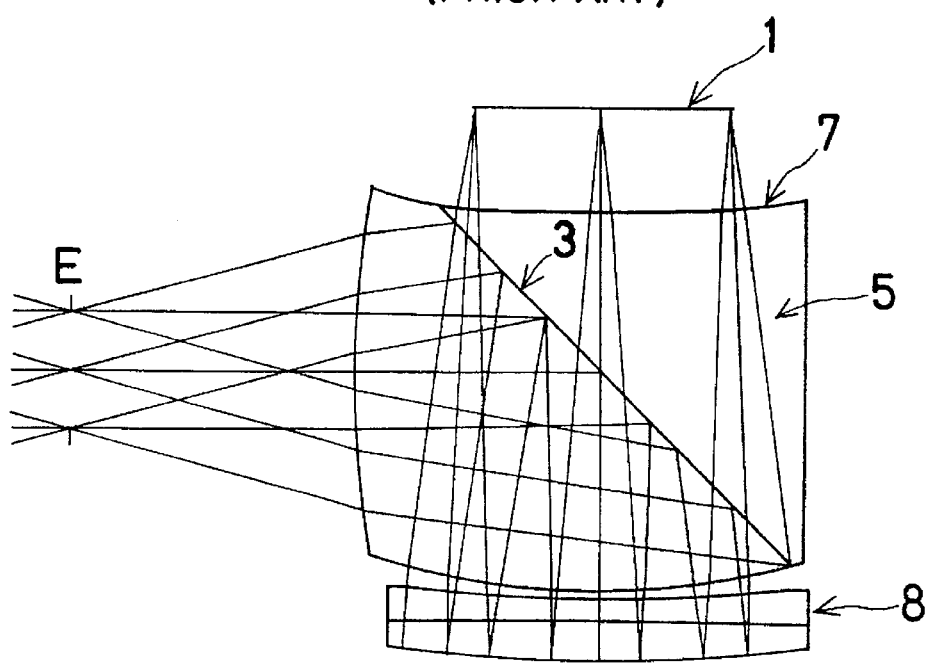
FIG. 42 is a sectional view showing the optical system of another conventional image display apparatus arranged to provide a wide field of view.

The arrangement of this example is similar to the arrangement shown in FIG. 42 except that the DOE 20 is used in place of the doublet 8 in FIG. 42. In this example, however, the spacing between the observer's eyeball pupil position E and the image display device 1 is smaller than in the arrangement shown in FIG. 42. Therefore, the arrangement of this example enables the field of view to be widened even more effectively.

Fifth Example

Figure 8:
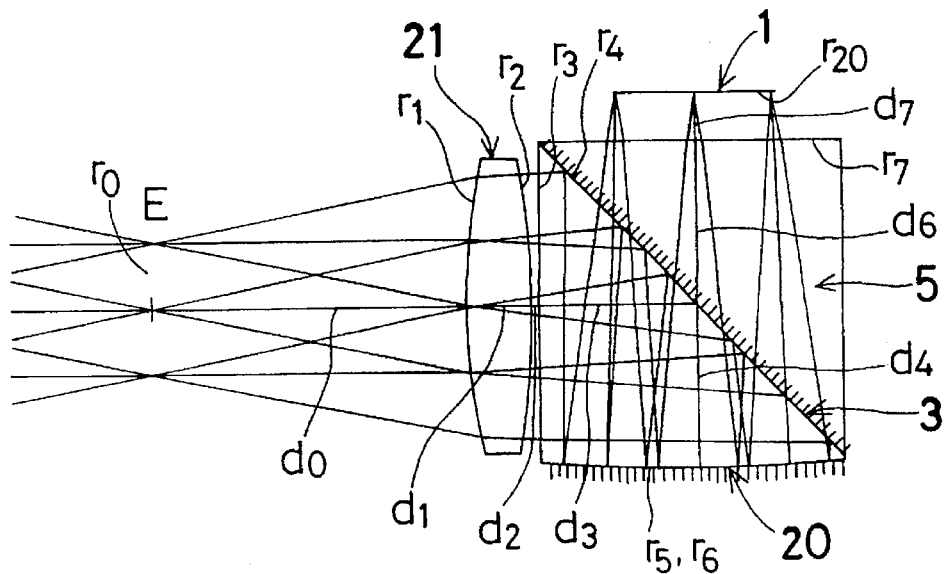
FIG. 8 is a sectional view of a lens system in a fifth example of the present invention.

FIG. 8 is a sectional view showing the lens system of a fifth example of the present invention. In FIG. 8, reference symbol E denotes the pupil position of an observer's eyeball. Reference numeral 1 denotes an image display device, 5 a beam splitter prism, 3 a half-mirror, 20 a DOE (diffraction surface), and 21 a lens having a positive refractive power. In this example, the lens 21 of positive power is used independently of the beam splitter prism 5 in place of the surface 22 of positive power provided on the eyeball side of the beam splitter prism 5 in the third example, thereby minimizing aberration and further widening the field of view.

Figure 28:
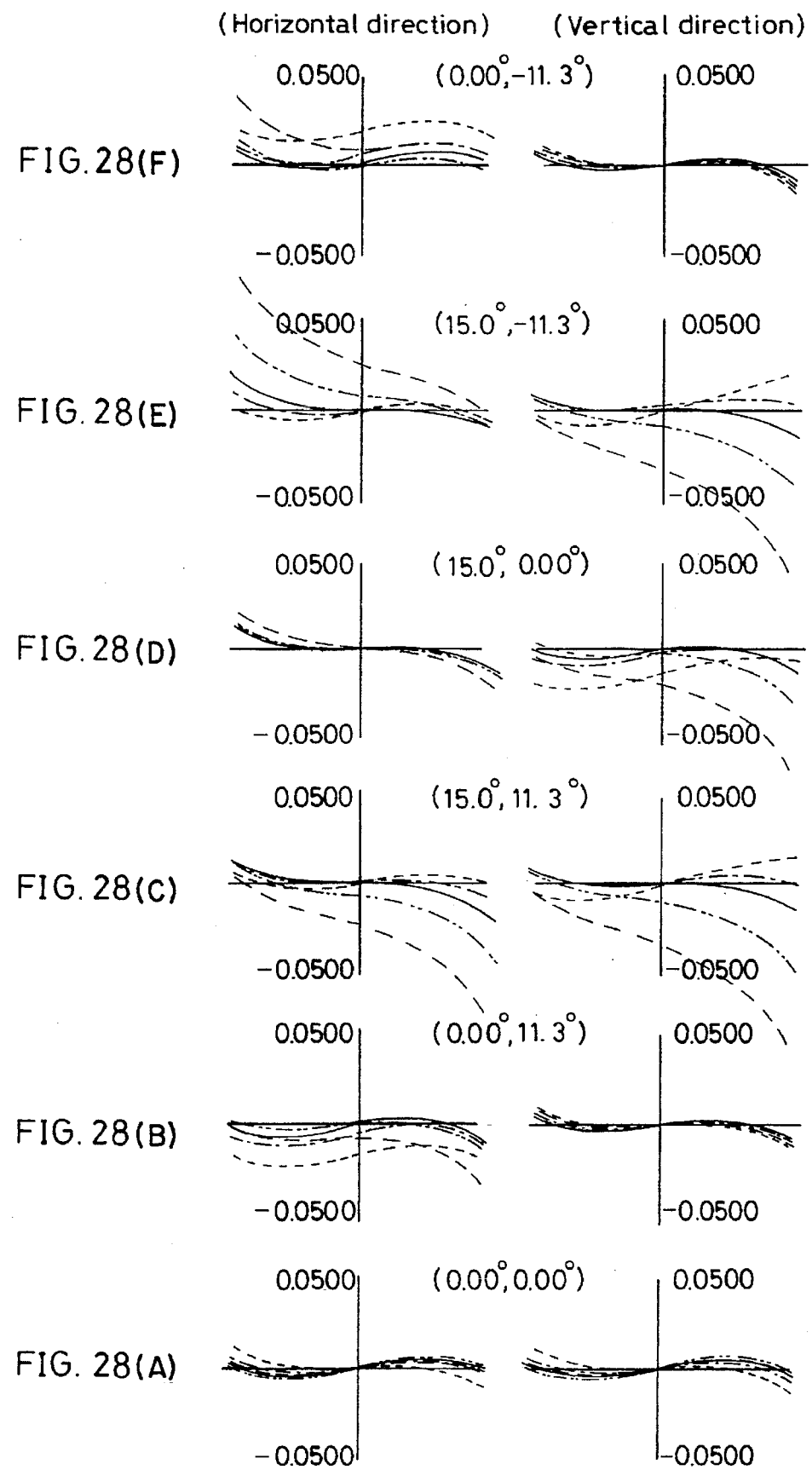
FIGS. 28(A) to 28(F) graphically show lateral aberration in the fifth example.

FIGS. 28(A) to 28(F) graphically show lateral aberration in the horizontal and vertical directions in this example at various angles to the image field: FIG. 28(A) shows aberration values in the direction of the visual axis (0° in the horizontal direction and 0° in the vertical direction); FIG. 28(B) shows aberration values at 0° in the horizontal direction and 11.3° in the vertical direction; FIG. 28(C) shows aberration values at 15° in the horizontal direction and 11.3° in the vertical direction; FIG. 28(D) shows aberration values at 15° in the horizontal direction and 0° in the vertical direction; FIG. 28(E) shows aberration values at 15° in the horizontal direction and −11.3° in the vertical direction; and FIG. 28(F) shows aberration values at 0° in the horizontal direction and −11.3° in the vertical direction.

It should be noted that in numerical data (described later) for this example, the 5-th surface is an aspherical surface, and the aspherical configuration is defined by Eq. (7). In addition, the 6-th surface is a surface (reflecting surface) of a substrate on which the DOE 20 is formed. The 5-th and 6-th surfaces define an ultra-high index lens equivalent to the DOE 20.

In this example, $f/f_{DOE}$=0.0802, and f=24.76. Thus, the conditions (2) and (12) are satisfied.

The DOE 20 in this example also has a pitch arrangement in which, as the distance from the optical axis increases toward the periphery of the clear aperture region, the pitch becomes larger than the pitch in a pitch arrangement that is determined on paraxial basis. More specifically, the pitch gradually decreases in a region extending from the center of the clear aperture to a position corresponding to 75% (8.8 mm) of the clear aperture, but the pitch gradually increases as the distance from the position corresponding to 75% of the clear aperture increases toward the outer side.

Sixth Example

Figure 9:
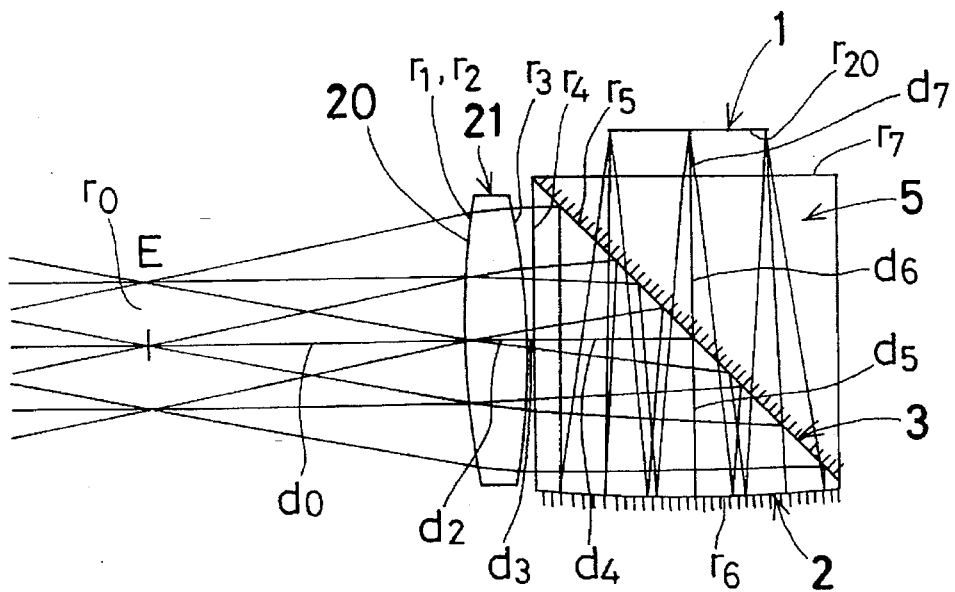
FIG. 9 is a sectional view of a lens system in a sixth example of the present invention.

FIG. 9 is a sectional view showing the lens system of a sixth example of the present invention. In FIG. 9, reference symbol E denotes the pupil position of an observer's eyeball. Reference numeral 1 denotes an image display device, 2 a concave mirror, 5 a beam splitter prism, 3 a half-mirror, 20 a DOE (diffraction surface), and 21 a lens having a positive refractive power. In this example, the beam splitter prism 5 is used in place of the half-mirror 3 in the first example in order to obtain a longer working distance and a wider field of view.

Figure 29:
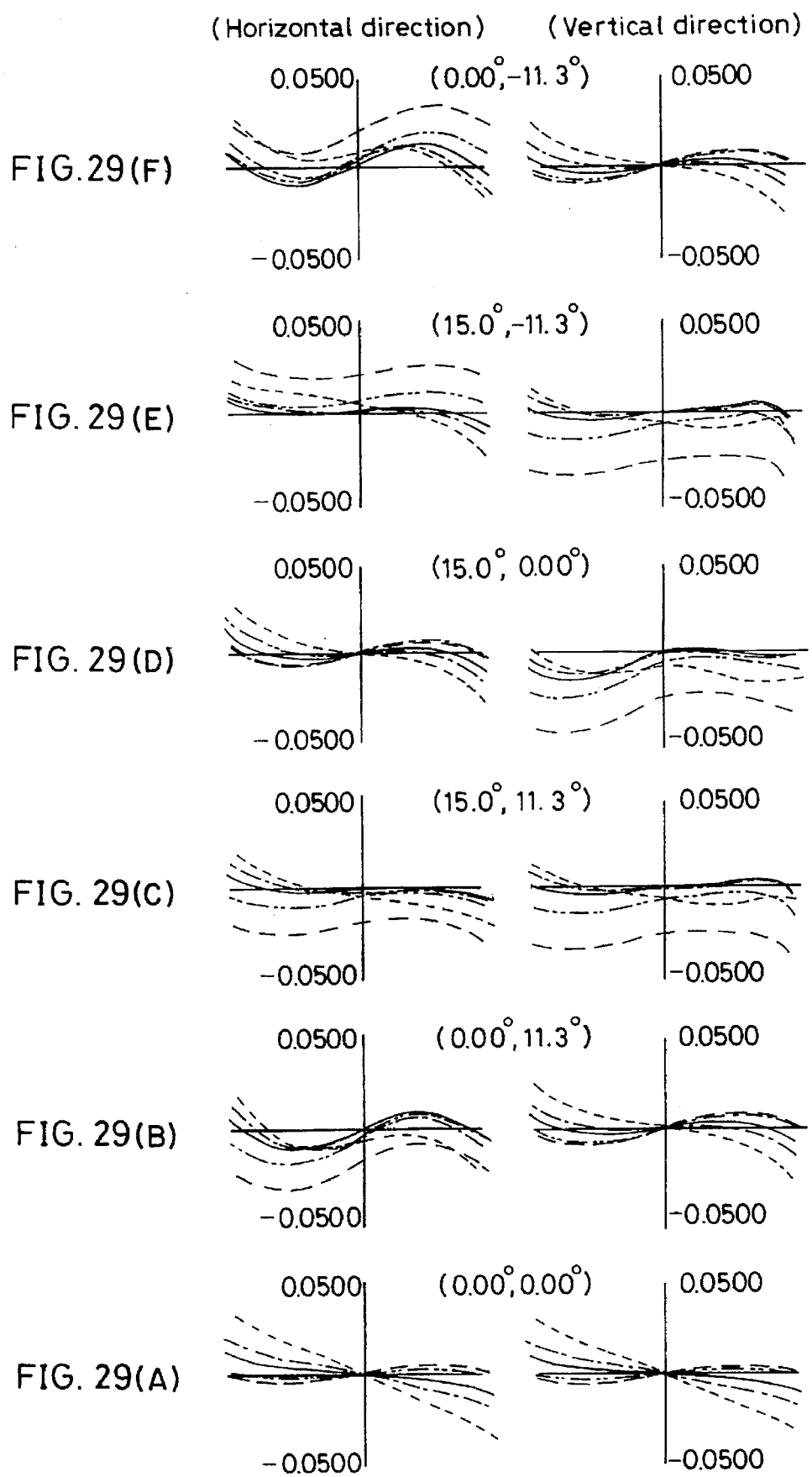
FIGS. 29(A) to 29(F) graphically show lateral aberration in the sixth example.

FIGS. 29(A) to 29(F) graphically show lateral aberration in the horizontal and vertical directions in this example at various angles to the image field: FIG. 29(A) shows aberration values in the direction of the visual axis (0° in the horizontal direction and 0° in the vertical direction); FIG. 29(B) shows aberration values at 0° in the horizontal direction and 11.3° in the vertical direction; FIG. 29(C) shows aberration values at 15° in the horizontal direction and 11.3° in the vertical direction; FIG. 29(D) shows aberration values at 15° in the horizontal direction and 0° in the vertical direction; FIG. 29(E) shows aberration values at 15° in the horizontal direction and −11.3° in the vertical direction; and FIG. 29(F) shows aberration values at 0° in the horizontal direction and −11.3° in the vertical direction.

It should be noted that in numerical data (described later) for this example, the 1-st surface is an aspherical surface, and the aspherical configuration is defined by Eq. (7). In addition, the 2-nd surface is a surface (refracting surface) of a substrate on which the DOE 20 is formed. The 1-st and 2-nd surfaces define an ultra-high index lens equivalent to the DOE 20.

In this example, $f/f_{DOE}$=0.0560, and f=24.81, which satisfy the conditions (10) and (2). Thus, chromatic aberration is effectively corrected.

Seventh Example

Figure 10:
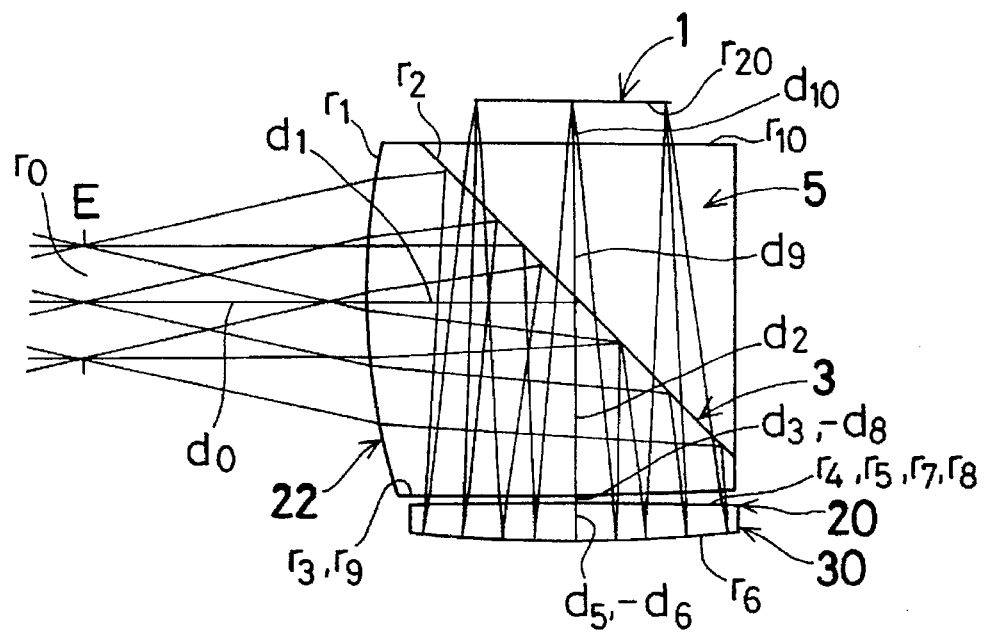
FIG. 10 is a sectional view of a lens system in a seventh example of the present invention.

FIG. 10 is a sectional view showing the lens system of a seventh example of the present invention. In FIG. 10, reference symbol E denotes the pupil position of an observer's eyeball. Reference numeral 1 denotes an image display device, 5 a beam splitter prism, 3 a half-mirror, 22 a beam splitter prism entrance surface (in backward tracing) having a positive refractive power, and 30 a positive lens having a DOE (diffraction surface) 20 formed on one side thereof and a spherical mirror formed on the other side thereof. In this example, the beam splitter prism 5 and the chromatic aberration correcting lens 30 are separated from each other.

Figure 30:
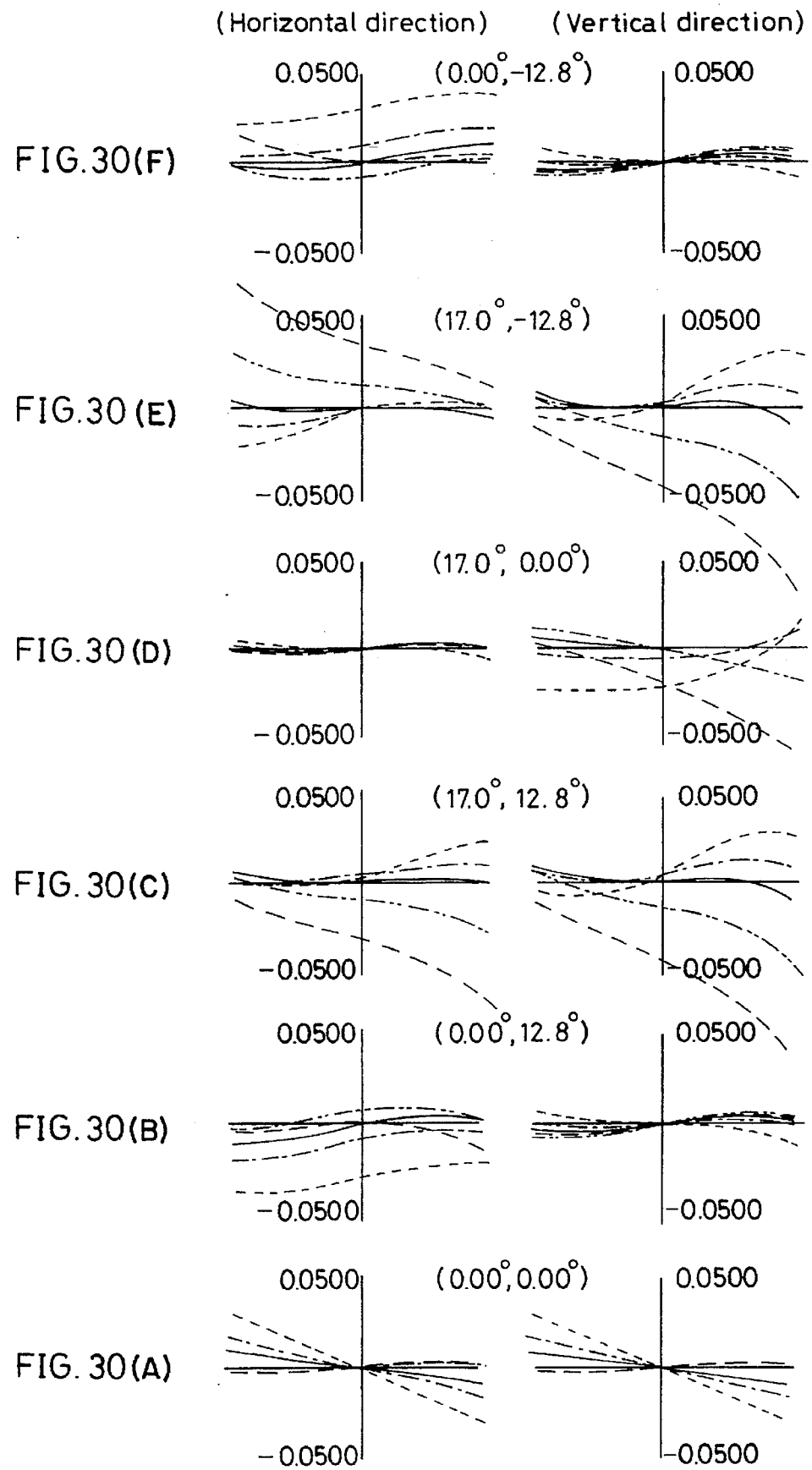
FIGS. 30(A) to 30(F) graphically show lateral aberration in the seventh example.

FIGS. 30(A) to 30(F) graphically show lateral aberration in the horizontal and vertical directions in this example at various angles to the image field: FIG. 30(A) shows aberration values in the direction of the visual axis (0° in the horizontal direction and 0° in the vertical direction); FIG. 30(B) shows aberration values at 0° in the horizontal direction and 12.8° in the vertical direction; FIG. 30(C) shows aberration values at 17° in the horizontal direction and 12.8° in the vertical direction; FIG. 30(D) shows aberration values at 17° in the horizontal direction and 0° in the vertical direction; FIG. 30(E) shows aberration values at 17° in the horizontal direction and −12.8° in the vertical direction; and FIG. 30(F) shows aberration values at 0° in the horizontal direction and −12.8° in the vertical direction.

It should be noted that in numerical data (described later) for this example, the 4-th and 8-th surfaces are aspherical surfaces, and the aspherical configuration is defined by Eq. (7). In addition, the 5-th (7-th) surface is a surface (refracting surface) of a substrate on which the DOE 20 is formed. The 4-th, 5-th, 7-th and 8-th surfaces define an ultra-high index lens equivalent to the DOE 20.

A Mangin mirror such as the lens 30 produces less negative Petzval sum than a simple concave reflecting mirror and is therefore favorable from the viewpoint of correcting field curvature.

In this example, a bundle of rays is reflected by the mirror after passing through the DOE 20 and then passes through the DOE 20 again. Consequently, the DOE 20 corrects chromatic aberration twice. Accordingly, the power required for the DOE 20 is about a half of the power of the DOE 20 as in the case of the second example. When the power of the DOE is weak, the secondary spectrum decreases. In addition, the pitch of the DOE increases, and the productivity improves, favorably.

In this example, since the focal length of the DOE 20 is 652.9 mm, $$f/f_{DOE}=2\times(30.08/652.9)=0.092$$

Further, the focal length of the entire optical system is f=30.08. Therefore, both the conditions (2) and (12) are satisfied, and thus chromatic aberration is effectively corrected.

When an ordinary glass lens is used, it is necessary to use a doublet composed of "a glass lens and a glass lens" in place of the lens 30. Therefore, the weight increases exceedingly. However, the use of the DOE 20 as in this example enables reduction of the weight. Further, if the DOE 20 is formed on a plastic substrate as in this example, the weight is reduced to a considerable extent.

If greater importance is attached to performance than to weight, the lens 30 should be formed into a doublet including the DOE 20. By doing so, the secondary spectrum reduces, and thus an apochromatic optical system can be realized. In this case, the lower limit value of the condition (12) becomes smaller.

The DOE 20 in this example also has a pitch arrangement in which, as the distance from the optical axis increases toward the periphery of the clear aperture region, the pitch becomes larger than the pitch in a pitch arrangement that is determined on paraxial basis. More specifically, the pitch gradually decreases in a region extending from the center of the clear aperture to a position corresponding to 67% (10.08 mm) of the clear aperture, but the pitch gradually increases as the distance from the position corresponding to 67% of the clear aperture increases toward the outer side. It should be noted that the minimum pitch is 65 µm, which is about double the value in the case of the fifth example.

Eighth Example

Figure 11:
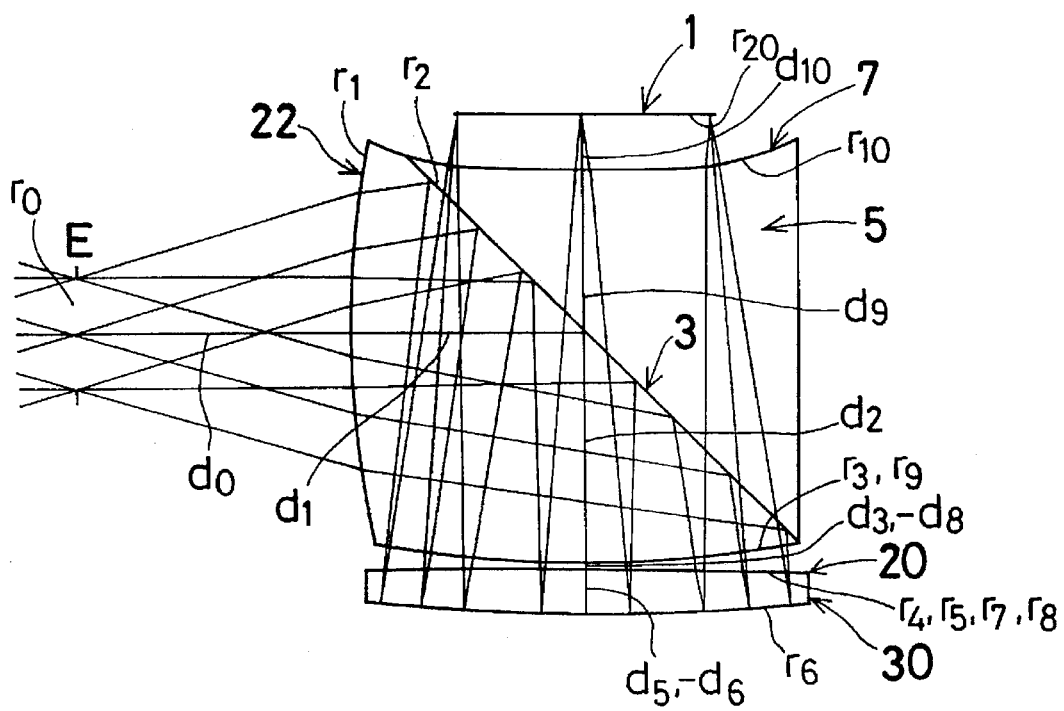
FIG. 11 is a sectional view of a lens system in an eighth example of the present invention.

FIG. 11 is a sectional view showing the lens system of an eighth example of the present invention. In FIG. 11, reference symbol E denotes the pupil position of an observer's eyeball. Reference numeral 1 denotes an image display device, 5 a beam splitter prism, 3 a half-mirror, 22 a beam splitter prism entrance surface (in backward tracing) having a positive refractive power, 7 a beam splitter prism exit surface (in backward tracing), and 30 a positive lens having a DOE (diffraction surface) 20 formed on one side thereof and a spherical mirror formed on the other side thereof. This example differs from the seventh example in that the image display device-side surface 7 of the beam splitter prism 5 is formed into an aspherical surface to correct distortion and to ensure telecentric properties.

Figure 31:
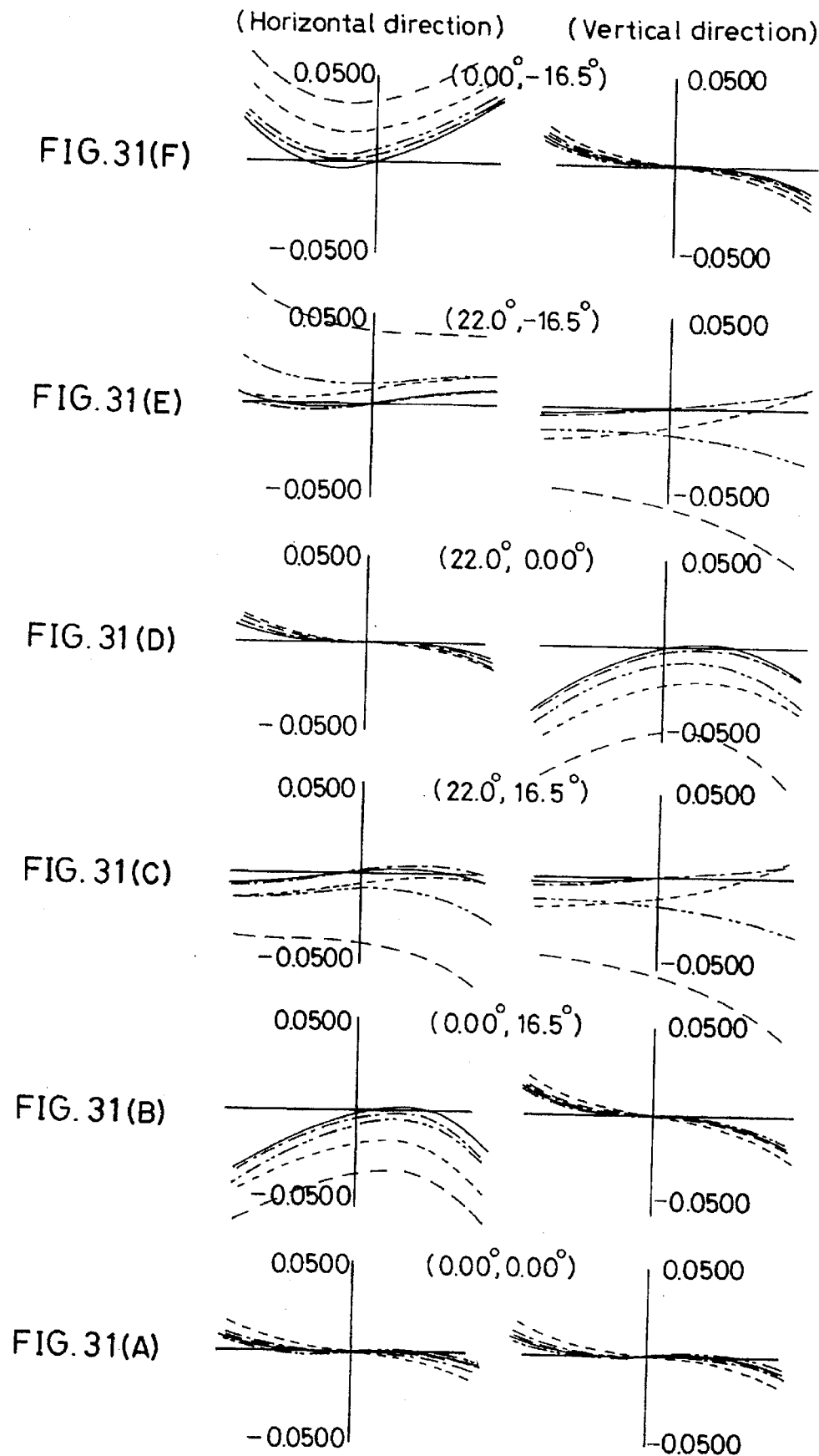
FIGS. 31(A) to 31(F) graphically show lateral aberration in the eighth example.

FIGS. 31(A) to 31(F) graphically show lateral aberration in the horizontal and vertical directions in this example at various angles to the image field: FIG. 31(A) shows aberration values in the direction of the visual axis (0° in the horizontal direction and 0° in the vertical direction); FIG. 31(B) shows aberration values at 0° in the horizontal direction and 16.5° in the vertical direction; FIG. 31(C) shows aberration values at 22° in the horizontal direction and 16.5° in the vertical direction; FIG. 31(D) shows aberration values at 22° in the horizontal direction and 0° in the vertical direction; FIG. 31(E) shows aberration values at 22° in the horizontal direction and −16.5° in the vertical direction; and FIG. 31(F) shows aberration values at 0° in the horizontal direction and −16.5° in the vertical direction.

It should be noted that in numerical data (described later) for this example, the 4-th, 8-th and 10-th surfaces are aspherical surfaces, and the aspherical configuration is defined by Eq. (7). In addition, the 5-th (7-th) surface is a surface (refracting surface) of a substrate on which the DOE 20 is formed. The 4-th, 5-th, 7-th and 8-th surfaces define an ultra-high index lens equivalent to the DOE 20.

In this example, $f/f_{DOE}=0.050$, and $f=31.04$. Therefore, both the conditions (2) and (12) are satisfied, and thus chromatic aberration is effectively corrected.

Ninth Example

Figure 12:
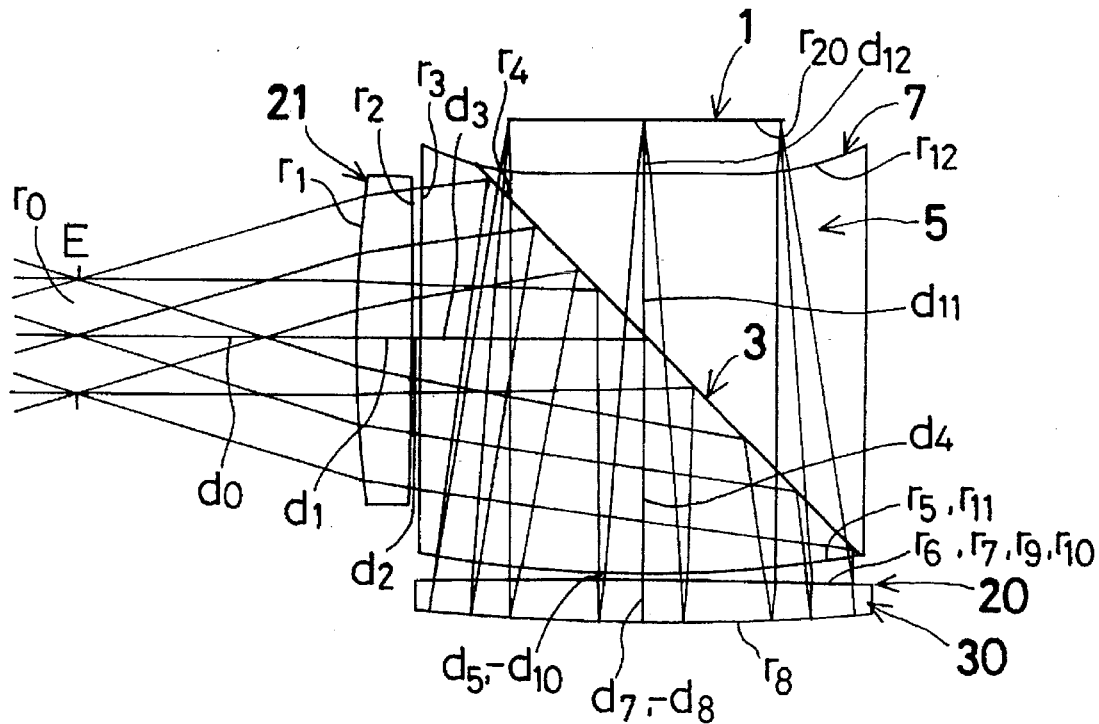
FIG. 12 is a sectional view of a lens system in a ninth example of the present invention.

FIG. 12 is a sectional view showing the lens system of a ninth example of the present invention. In FIG. 12, reference symbol E denotes the pupil position of an observer's eyeball. Reference numeral 1 denotes an image display device, 5 a beam splitter prism, 3 a half-mirror, 21 a lens having a positive refractive power, 7 a beam splitter prism exit surface (in backward tracing), and 30 a positive lens having a DOE (diffraction surface) 20 formed on one side thereof and a spherical mirror formed on the other side thereof. In this example, the lens 21 of positive power is used independently of the beam splitter prism 5 in place of the surface 22 of positive power provided on the eyeball side of the beam splitter prism 5 in the eighth example, thereby further reducing aberration.

Figure 32:
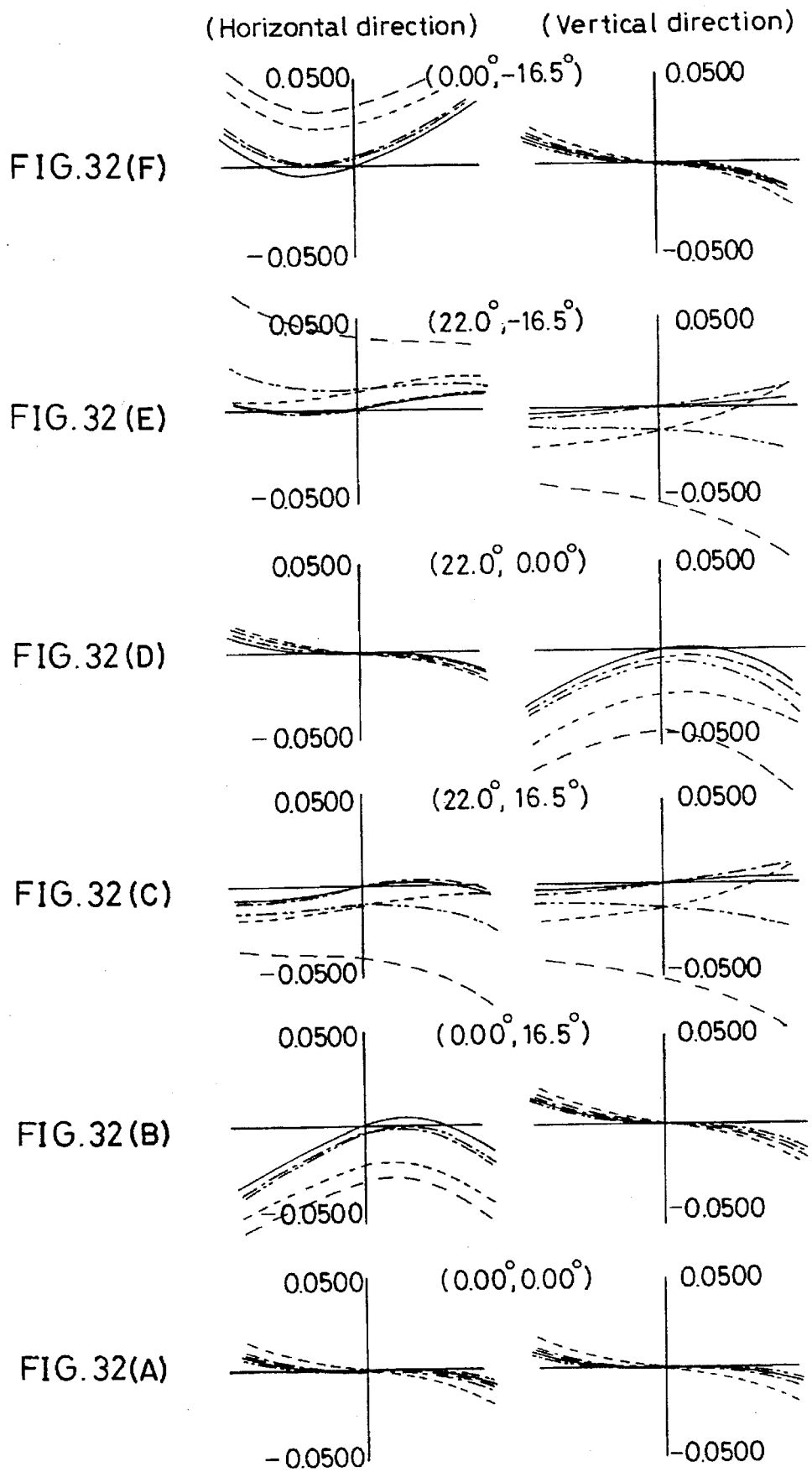
FIGS. 32(A) to 32(F) graphically show lateral aberration in the ninth example.

FIGS. 32(A) to 32(F) graphically show lateral aberration in the horizontal and vertical directions in this example at various angles to the image field: FIG. 32(A) shows aberration values in the direction of the visual axis (0° in the horizontal direction and 0° in the vertical direction); FIG. 32(B) shows aberration values at 0° in the horizontal direction and 16.5° in the vertical direction; FIG. 32(C) shows aberration values at 22° in the horizontal direction and 16.5° in the vertical direction; FIG. 32(D) shows aberration values at 22° in the horizontal direction and 0° in the vertical direction; FIG. 32(E) shows aberration values at 22° in the horizontal direction and −16.5° in the vertical direction; and FIG. 32(F) shows aberration values at 0° in the horizontal direction and −16.5° in the vertical direction.

It should be noted that in numerical data (described later) for this example, the 6-th, 10th and 12-th surfaces are aspherical surfaces, and the aspherical configuration is defined by Eq. (7). In addition, the 7-th (9-th) surface is a surface (refracting surface) of a substrate on which the DOE 20 is formed. The 6-th, 7-th, 9-th and 10-th surfaces define an ultra-high index lens equivalent to the DOE 20.

In this example, $f/f_{DOE}=0.055$, and $f=32.42$, which satisfy the conditions (2) and (12). Thus, chromatic aberration is effectively corrected.

Tenth Example

Figure 13:
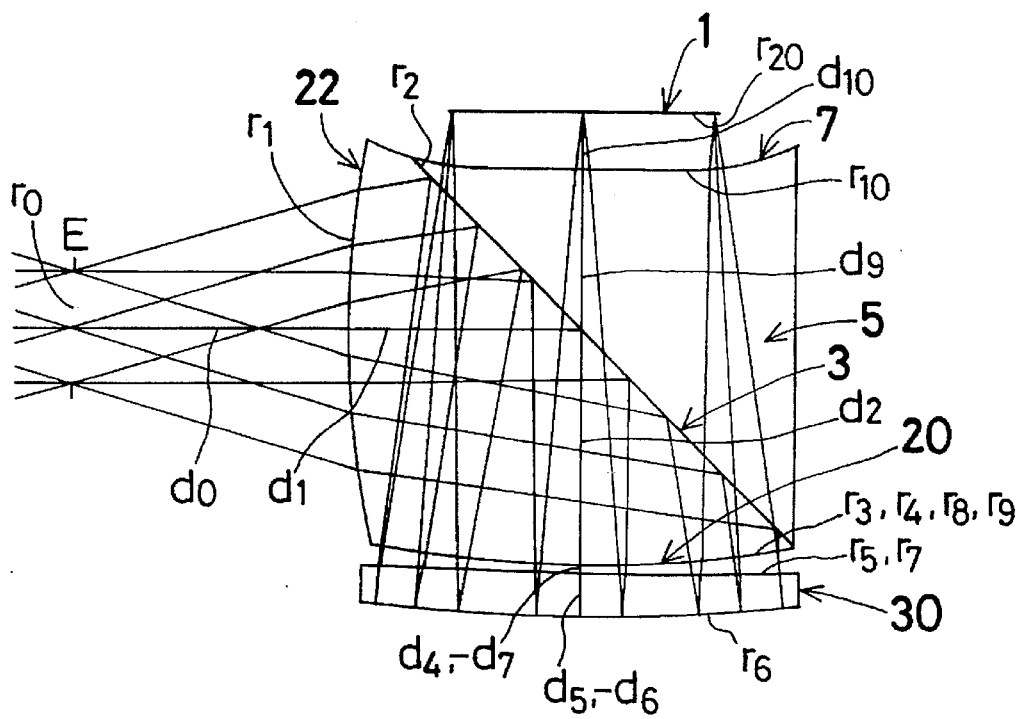
FIG. 13 is a sectional view of a lens system in a tenth example of the present invention.

FIG. 13 is a sectional view showing the lens system of a tenth example of the present invention. In FIG. 13, reference symbol E denotes the pupil position of an observer's eyeball. Reference numeral 1 denotes an image display device, 5 a beam splitter prism, 3 a half-mirror, 22 a beam splitter entrance surface (in backward tracing) having a positive refractive power, 7 a beam splitter prism exit surface (in backward tracing), and 30 a positive lens having a spherical mirror formed on one side thereof. In this example, a diffraction surface 20 is formed on a surface of the prism 5 which is in the vicinity of the reflecting mirror.

Figure 33:
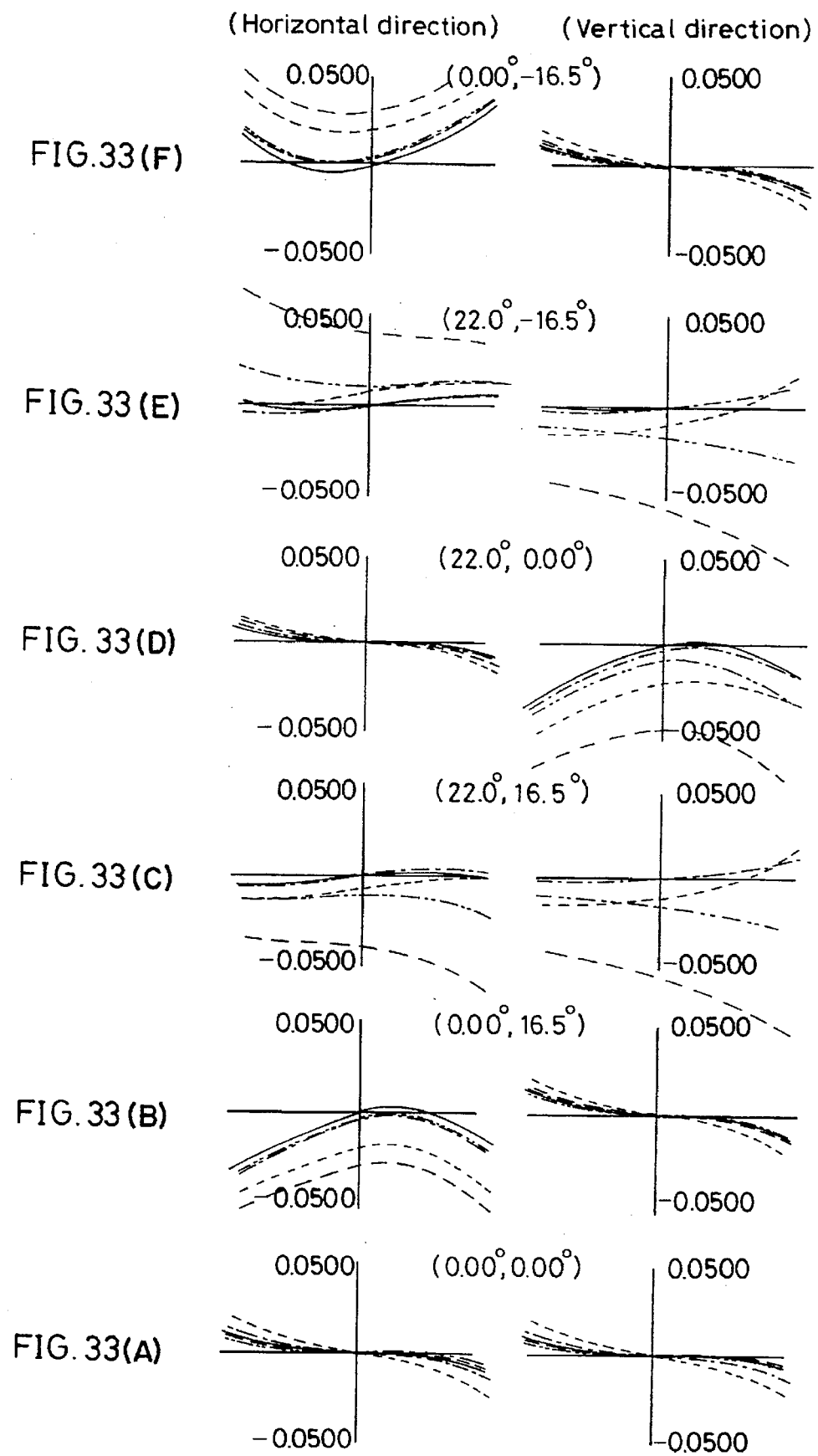
FIGS. 33(A) to 33(F) graphically show lateral aberration in the tenth example.

FIGS. 33(A) to 33(F) graphically show lateral aberration in the horizontal and vertical directions in this example at various angles to the image field: FIG. 33(A) shows aberration values in the direction of the visual axis (0° in the horizontal direction and 0° in the vertical direction); FIG. 33(B) shows aberration values at 0° in the horizontal direction and 16.5° in the vertical direction; FIG. 33(C) shows aberration values at 22° in the horizontal direction and 16.5° in the vertical direction; FIG. 33(D) shows aberration values at 22° in the horizontal direction and 0° in the vertical direction; FIG. 33(E) shows aberration values at 22° in the horizontal direction and −16.5° in the vertical direction; and FIG. 33(F) shows aberration values at 0° in the horizontal direction and −16.5° in the vertical direction.

It should be noted that in numerical data (described later) for this example, the 4-th, 8-th and 10th surfaces are aspherical surfaces, and the aspherical configuration is defined by Eq. (7). In addition, the 3-rd (9-th) surface is a surface (refracting surface) of a substrate on which the DOE 20 is formed. The 3-rd, 4-th, 8-th and 9-th surfaces define an ultra-high index lens equivalent to the DOE 20.

In this example, $f/f_{DOE}=0.055$, and $f=31.58$, which satisfy the conditions (2) and (12). Thus, chromatic aberration is effectively corrected.

Eleventh to Twentieth Examples

Figure 14:
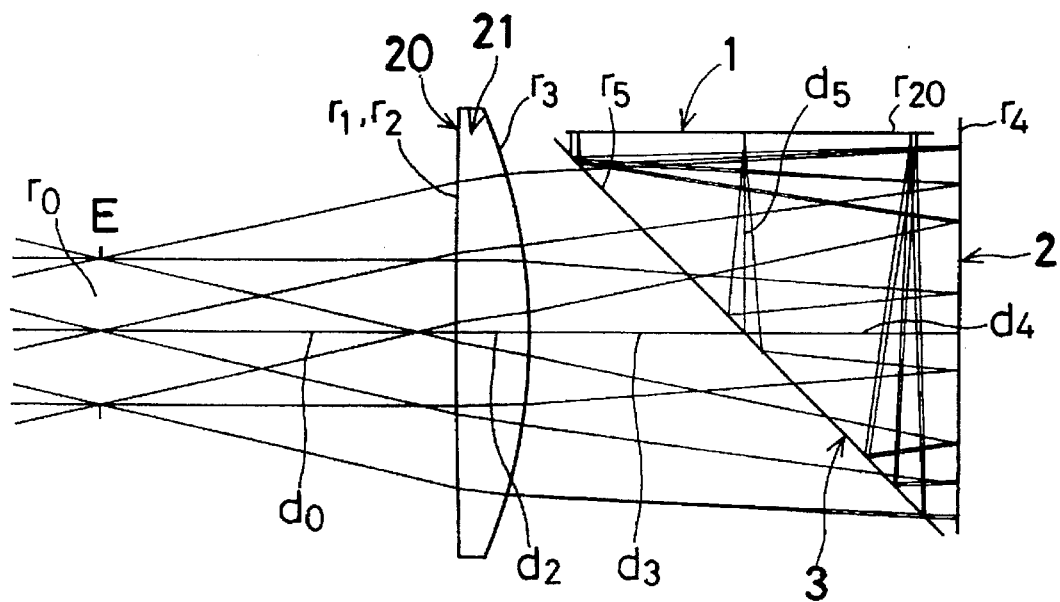
FIG. 14 is a sectional view of a lens system in an eleventh example of the present invention.
Figure 15:
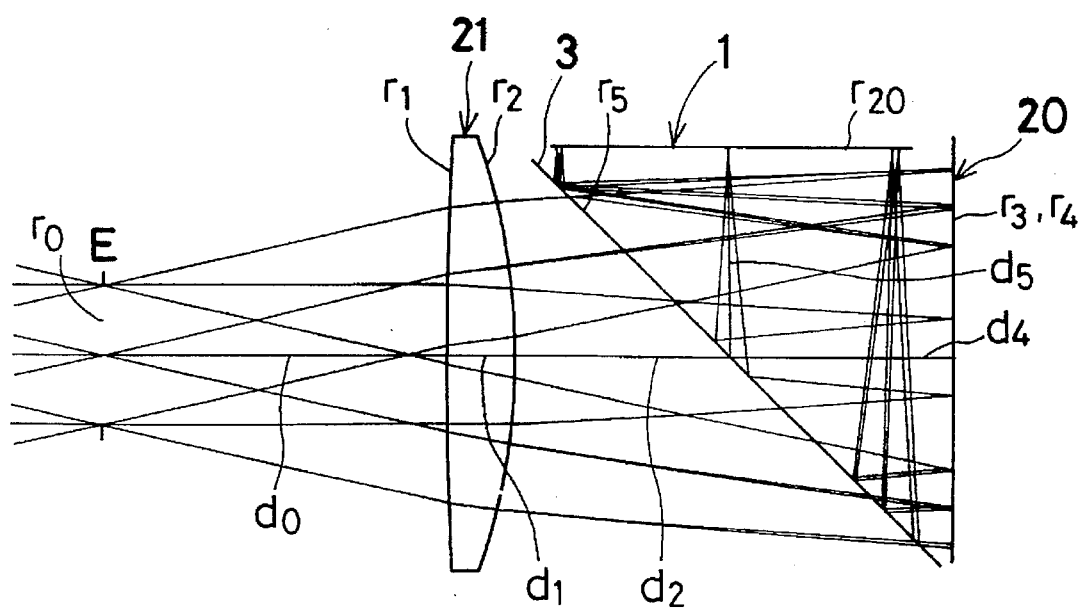
FIG. 15 is a sectional view of a lens system in a twelfth example of the present invention.
Figure 16:
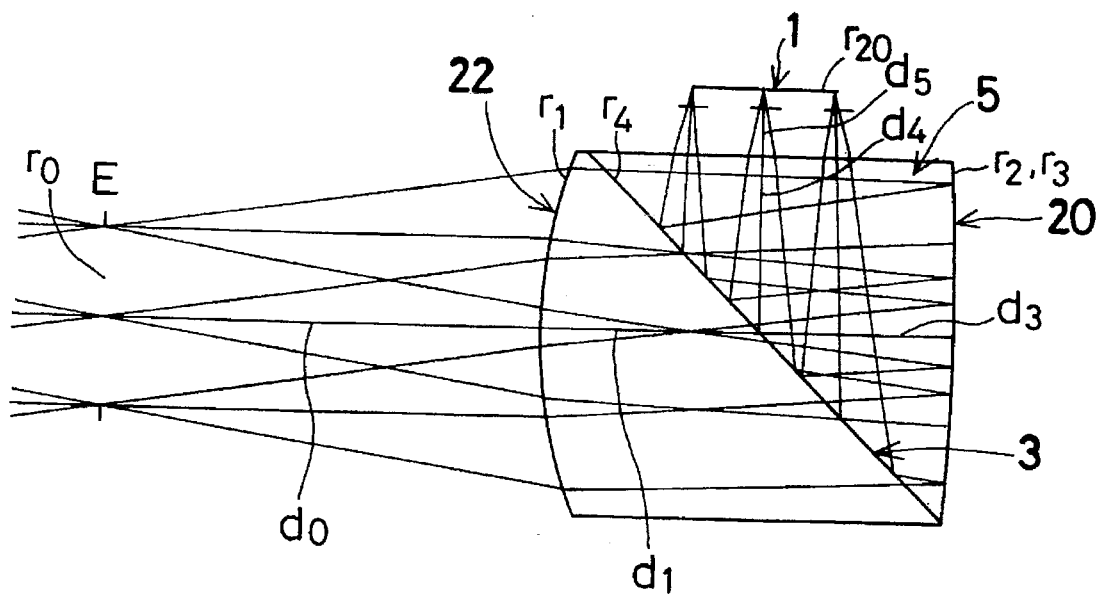
FIG. 16 is a sectional view of a lens system in a thirteenth example of the present invention.
Figure 17:
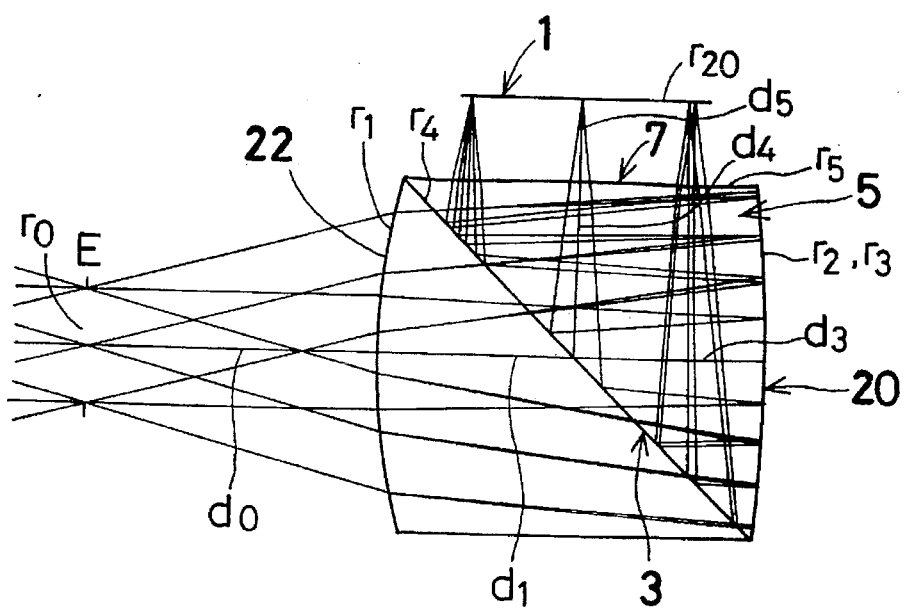
FIG. 17 is a sectional view of a lens system in a fourteenth example of the present invention.
Figure 18:
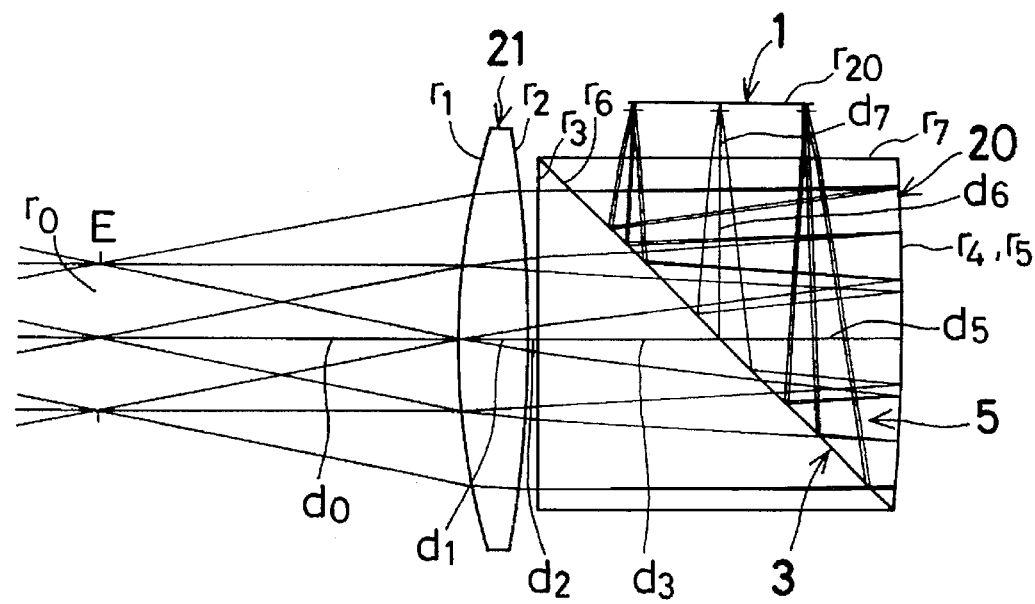
FIG. 18 is a sectional view of a lens system in a fifteenth example of the present invention.
Figure 19:
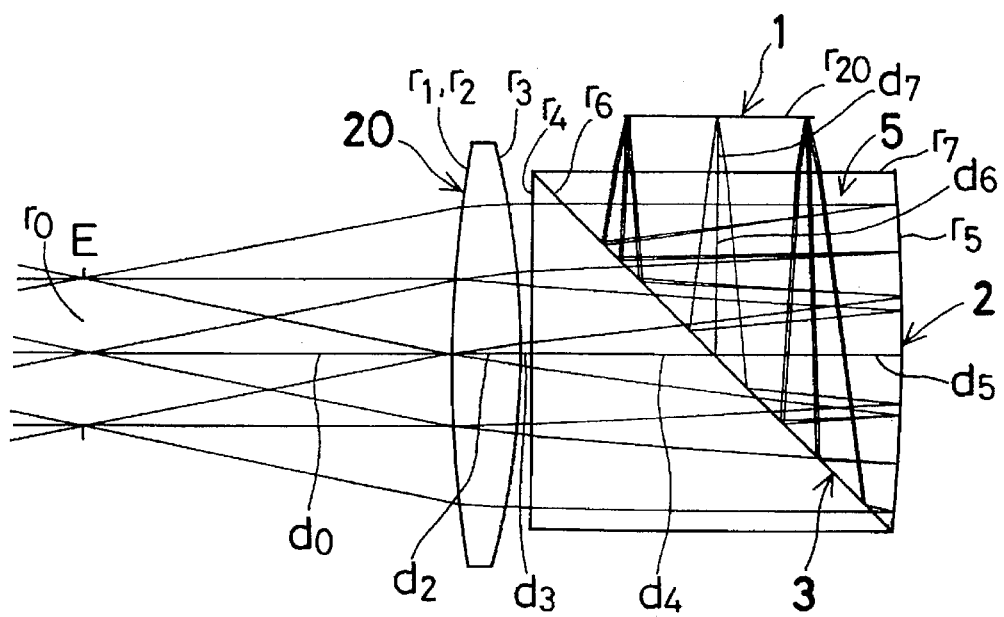
FIG. 19 is a sectional view of a lens system in a sixteenth example of the present invention.
Figure 20:
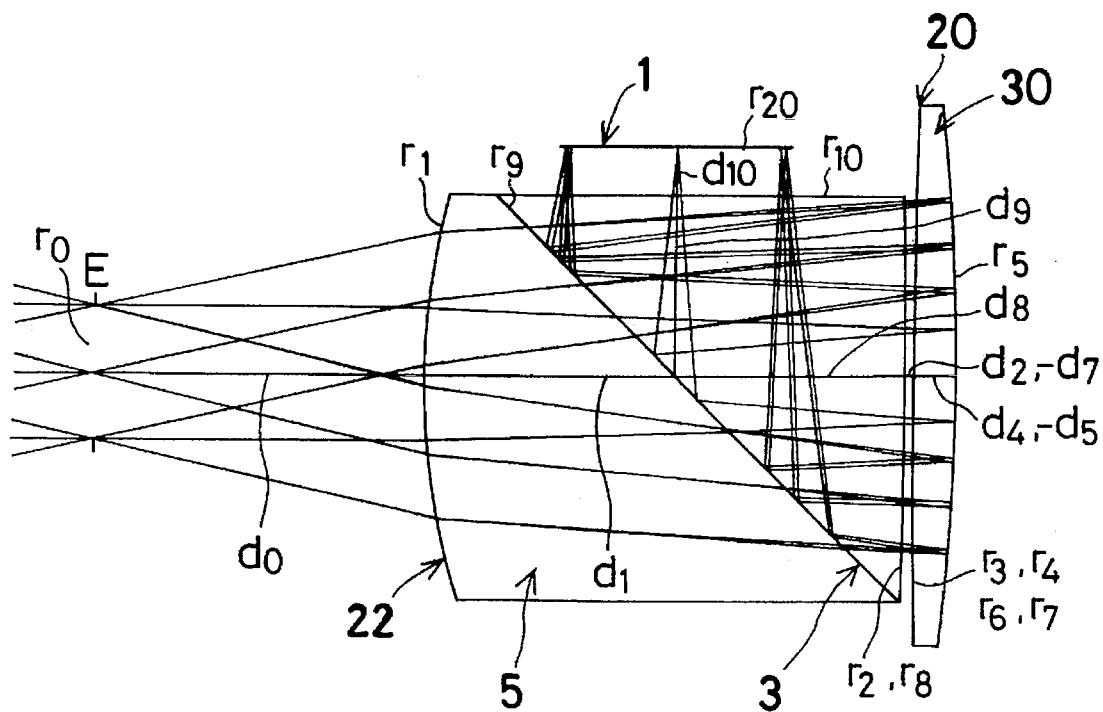
FIG. 20 is a sectional view of a lens system in a seventeenth example of the present invention.
Figure 21:
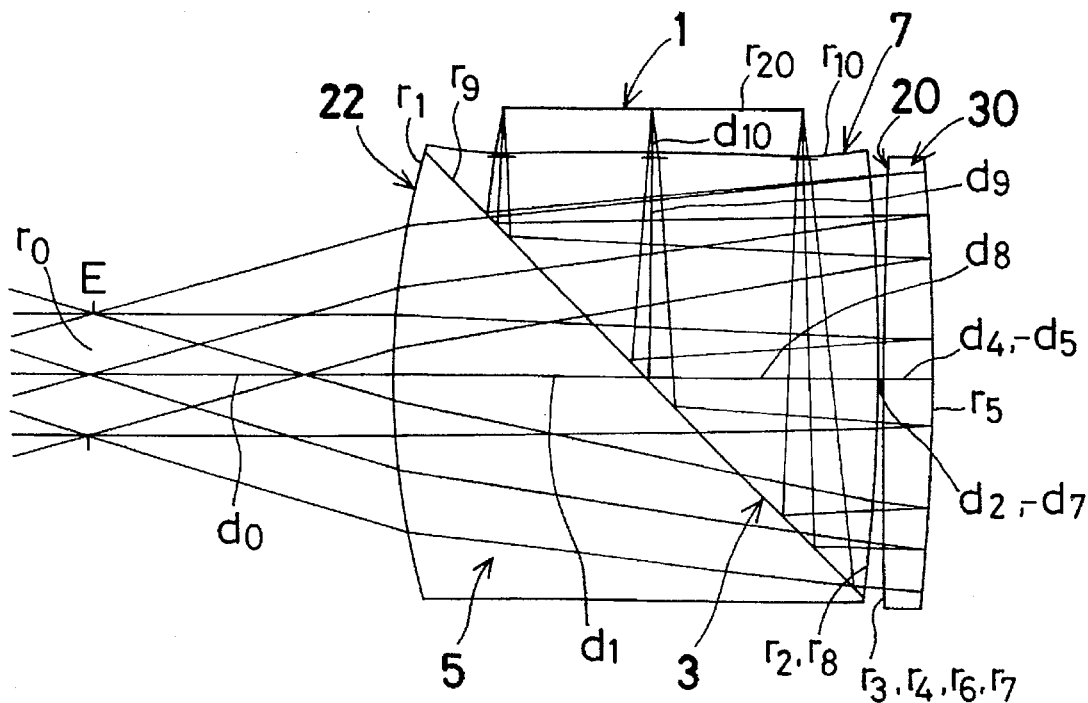
FIG. 21 is a sectional view of a lens system in an eighteenth example of the present invention.
Figure 22:
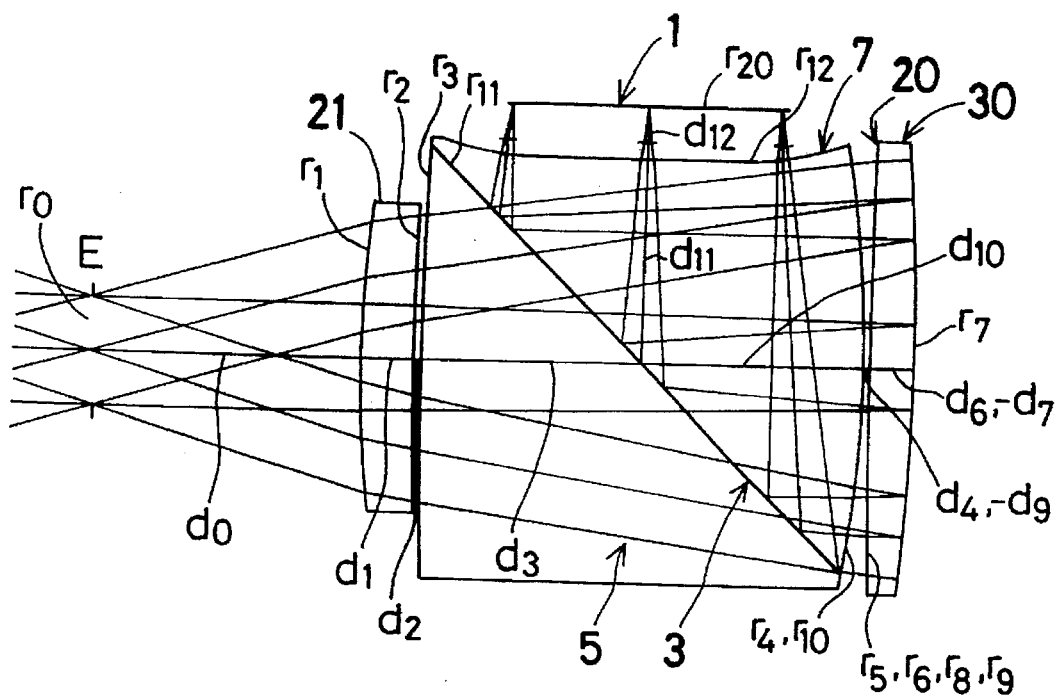
FIG. 22 is a sectional view of a lens system in a nineteenth example of the present invention.
Figure 23:
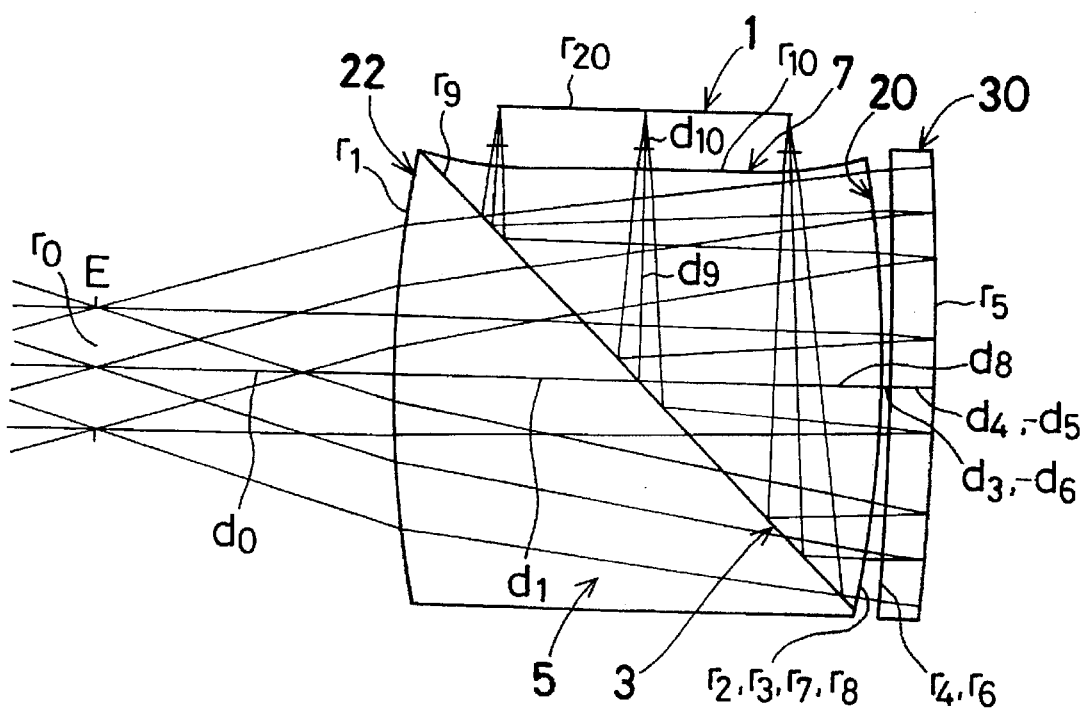
FIG. 23 is a sectional view of a lens system in a twentieth example of the present invention.

In the foregoing first to tenth examples, the concave mirror 2 and the image display device 1 are disposed to face each other on an axis intersecting the visual axis, as shown, for example, in FIG. 4, and the half-mirror 3 is disposed between these elements at an angle such that display light that is reflected by the concave mirror 2 is reflected in the direction of the observer's visual axis. However, the concave mirror 2 and the half-mirror 3 may be disposed as shown, for example, in FIG. 14, which is a sectional view illustrating an eleventh example of the present invention. That is, the arrangement may be such that the concave mirror 2 is disposed forwardly in the direction of the visual axis, and the half-mirror 3 is disposed on the visual axis so as to reflect light from the image display device 1, which is disposed outside the visual field, so that the reflected light is incident on the concave mirror 2, and to transmit the reflected light from the concave mirror 2 to the pupil position E.

FIGS. 14 to 23 are sectional views showing eleventh to twentieth examples formed by modifying the first to tenth examples as described above.

Figure 34:
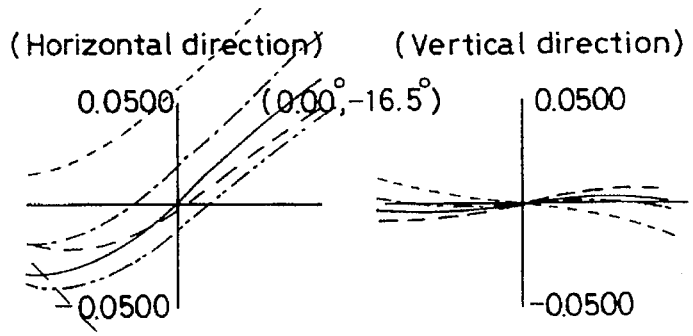
FIGS. 34(A) to 34(F) graphically show lateral aberration in the eighteenth example.
Figure 35:
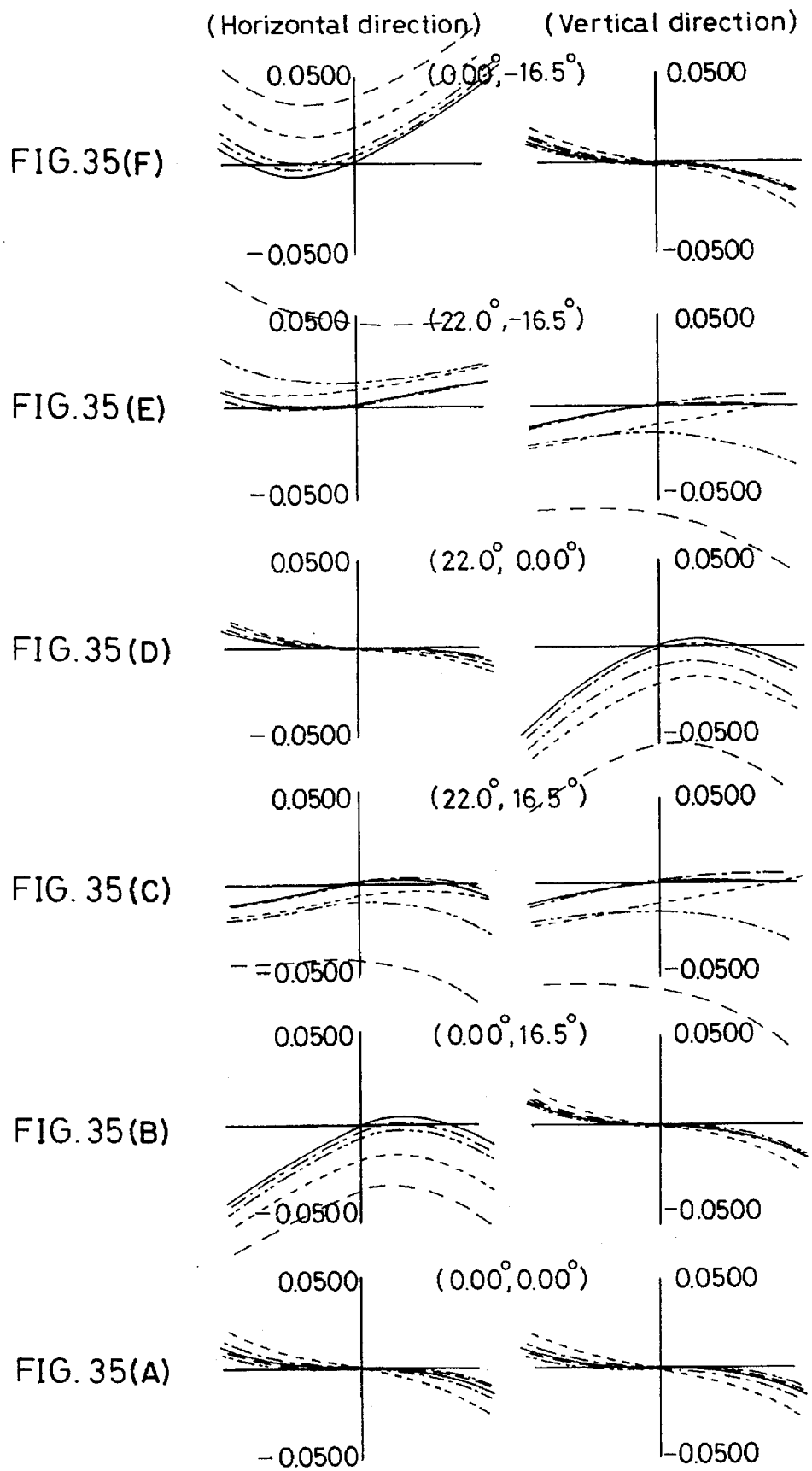
FIGS. 35(A) to 35(F) graphically show lateral aberration in the nineteenth example.
Figure 36:
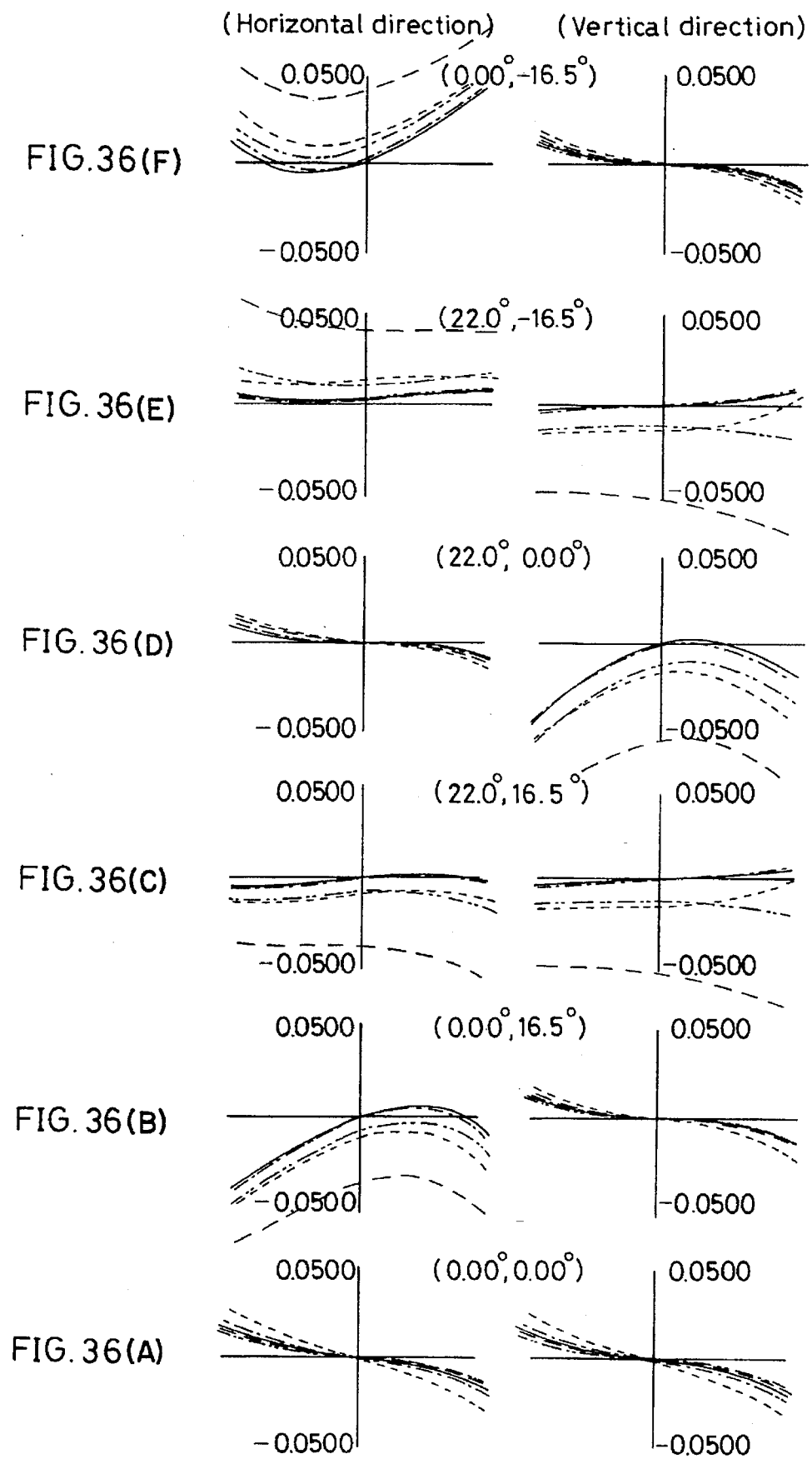
FIGS. 36(A) to 36(F) graphically show lateral aberration in the twentieth example.

Since the optical performances of the eleventh to seventeenth examples are the same as those of the first to seventh examples, illustration of lateral aberration curves for these examples is omitted. The eighteenth to twentieth examples are different from the eighth to tenth examples in numerical data and optical performance. Therefore, lateral aberration curves illustrating the optical performances of the eighteenth to twentieth examples are shown in FIGS. 34(A) to 36(F). FIGS. 34(A) to 36(F) graphically show lateral aberration in the horizontal and vertical directions at various angles to the image field: FIGS. 34(A), 35(A) and 36(A) show aberration values in the direction of the visual axis (0° in the horizontal direction and 0° in the vertical direction); FIGS. 34(B), 35(B) and 36(B) show aberration values at 0° in the horizontal direction and 16.5° in the vertical direction; FIGS. 34(C), 35(C) and 36(C) show aberration values at 22° in the horizontal direction and 16.5° in the vertical direction; FIGS. 34(D), 35(D) and 36(D) show aberration values at 22° in the horizontal direction and 0° in the vertical direction; FIGS. 34(F), 35(F) and 36(F) show aberration values at 22° in the horizontal direction and −16.5° in the vertical direction; and FIGS. 34(F), 35(F) and 36(F) show aberration values at 0° in the horizontal direction and −16.5° in the vertical direction.

Numerical data for the first to twentieth examples will be shown below. These data are all shown in the order of backward tracing from the pupil E to the image display device 1. In all the examples, symbol $r_0$ denotes the pupil E, and $d_0$ the working distance (eye relief). Further, $r_1, r_2 \ldots$ are the radii of curvature of lens surfaces or reflecting surfaces, $d_1, d_2 \ldots$ are the spacings between adjacent surfaces, $nd_1, nd_2 \ldots$ are the refractive indices for the spectral d-line of vitreous materials, $v_{d1}, v_{d2} \ldots$ are the Abbe's numbers of the vitreous materials, and $r_{20}$ denotes the image display device 1. The numerical data on the curvature radius, surface separations, refractive index, and Abbe's number contains the ultra-high index lens, which expresses the DOE 20, as described above. It should be noted that the refractive index of the imaginary vitreous material (DOE) constituting the ultra-high index lens is assumed as follows: $n_C$=1118.0; $n_d$=1001; $n_e$=930.39; $n_F$=828.37; and $n_g$=742.78. The aspherical configuration is expressed by the above-described Eq. (7). It should be noted that in all the examples the effective pupil diameter at the pupil position E is 8 mm, and the half-mirror 3 is disposed at 45° to the optical axis.

Example 1
field of view: 34 × 25.6°

| | | | | |
|---|---|---|---|---|
| $r_0 =$ | ∞ (pupil) | $d_0 = 20.000000$ | | |
| $r_1 =$ | 773781.74121 (DOE) (aspheric surface) | $d_1 = 0.000000$ | $n_{d1} = 1001$ | $v_{d1} = -3.45$ |
| $r_2 =$ | ∞ | $d_2 = 4.000000$ | $n_{d2} = 1.5254$ | $v_{d2} = 56.25$ |
| $r_3 =$ | −31.87344 | $d_3 = 12.000000$ | | |
| $r_4 =$ | ∞ (semitransparent surface) | $d_4 = -12.000000$ | | |
| $r_5 =$ | 228.38756 (reflecting surface) | $d_5 = 23.0$ | | |
| $r_{20} =$ | ∞ (display surface) | | | |

Aspherical Coefficients
1st surface $k = -1.000000$
$A = -0.763110 \times 10^{-9}$
$B = 0.112135 \times 10^{-11}$
$C = D = 0$

Example 2
field of view: 34 × 25.6°

| | | | | |
|---|---|---|---|---|
| $r_0 =$ | ∞ (pupil) | $d_0 = 20.000000$ | | |
| $r_1 =$ | 340.15056 | $d_1 = 4.000000$ | $n_{d1} = 1.5254$ | $v_{d1} = 56.25$ |
| $r_2 =$ | −37.52897 | $d_2 = 12.000000$ | | |
| $r_3 =$ | ∞ (semitransparent surface) | $d_3 = -13.000000$ | | |
| $r_4 =$ | 199.63746 (DOE) (aspheric surface) | $d_4 = 0.000000$ | $n_{d2} = 1001$ | $v_{d2} = -3.45$ |
| $r_5 =$ | 199.58391 (reflecting surface) | $d_5 = 25.0$ | | |
| $r_{20} =$ | ∞ (display surface) | | | |

Asphrical Coefficients
4th surface $k = -1.000000$
$A = 0.176327 \times 10^{-7}$
$B = -0.133317 \times 10^{-10}$
$C = 0.457458 \times 10^{-13}$
$D = -0.580075 \times 10^{-16}$

Example 3
field of view: 24 × 18°

| | | | | |
|---|---|---|---|---|
| $r_0 =$ | ∞ (pupil) | $d_0 = 20.000000$ | | |
| $r_1 =$ | 21.99560 | $d_1 = 10.000000$ | $n_{d1} = 1.5254$ | $v_{d1} = 56.25$ |
| $r_2 =$ | ∞ (semitransparent surface) | $d_2 = -9.000000$ | $n_{d2} = 1.5254$ | $v_{d2} = 56.25$ |
| $r_3 =$ | 104.64047 (DOE) (aspheric surface) | $d_3 = 0.000000$ | $n_{d3} = 1001$ | $v_{d3} = -3.45$ |
| $r_4 =$ | 104.58419 (reflecting surface) | $d_4 = 17.000000$ | $n_{d4} = 1.5254$ | $v_{d4} = 56.25$ |
| $r_5 =$ | ∞ | $d_5 = 3.04$ | | |
| $r_{20} =$ | ∞ (display surface) | | | |

Asphrical Coefficients
3rd surface $k = -1.000000$
$A = 0.124162 \times 10^{-6}$
$B = 0.129508 \times 10^{-10}$
$C = 0.315499 \times 10^{-12}$
$D = -0.151371 \times 10^{-14}$

Example 4
field of view: 40 × 30°

| | | | | |
|---|---|---|---|---|
| $r_0 =$ | ∞ (pupil) | $d_0 = 20.000000$ | | |
| $r_1 =$ | 43.51033 | $d_1 = 14.000000$ | $n_{d1} = 1.5254$ | $v_{d1} = 56.25$ |

-continued

| | | | | |
|---|---|---|---|---|
| $r_2 =$ | ∞ (semitransparent surface) | $d_2 = -13.000000$ | $n_{d2} = 1.5254$ | $v_{d2} = 56.25$ |
| $r_3 =$ | 120.84016 (DOE) (aspheric surface) | $d_3 = 0.000000$ | $n_{d3} = 1001$ | $v_{d3} = -3.45$ |
| $r_4 =$ | 120.80362 (reflecting surface) | $d_4 = 25.000000$ | $n_{d4} = 1.5254$ | $v_{d4} = 56.25$ |
| $r_5 =$ | ∞ (aspheric surface) | $d_5 = 6.00$ | | |
| $r_{20} =$ | ∞ (display surface) | | | |

Asphrical Coefficients
3rd surface $k = -1.000000$
$A = 0.744292 \times 10^{-7}$
$B = -0.765828 \times 10^{-11}$
$C = 0.136963 \times 10^{-13}$
$D = 0$ 5th surface $k = -1.000000$
$A = -0.327713 \times 10^{-4}$
$B = 0.239321 \times 10^{-6}$
$C = D = 0$ Example 5
field of view: 30 × 22.6°

| | | | | |
|---|---|---|---|---|
| $r_0 =$ | ∞ (pupil) | $d_0 = 20.000000$ | | |
| $r_1 =$ | 39.89546 | $d_1 = 4.000000$ | $n_{d1} = 1.5254$ | $v_{d1} = 56.25$ |
| $r_2 =$ | -65.09032 | $d_2 = 0.500000$ | | |
| $r_3 =$ | ∞ | $d_3 = 10.000000$ | $n_{d2} = 1.5254$ | $v_{d2} = 56.25$ |
| $r_4 =$ | ∞ (semitransparent surface) | $d_4 = -10.000000$ | $n_{d3} = 1.5254$ | $v_{d3} = 56.25$ |
| $r_5 =$ | 120.00552 (DOE) (aspheric surface) | $d_5 = 0.000000$ | $n_{d4} = 1001$ | $v_{d4} = -3.45$ |
| $r_6 =$ | 119.95889 (reflecting surface) | $d_6 = 20.000000$ | $n_{d5} = 1.5254$ | $v_{d5} = 56.25$ |
| $r_7 =$ | ∞ | $d_7 = 3.01$ | | |
| $r_{20} =$ | ∞ (display surface) | | | |

Asphrical Coefficients
5th surface $k = -1.000000$
$A = 0.760676 \times 10^{-7}$
$B = 0.180639 \times 10^{-11}$
$C = 0$
$D = 0.103948 \times 10^{-15}$ Example 6
field of view: 30 × 22.6°

| | | | | |
|---|---|---|---|---|
| $r_0 =$ | ∞ (pupil) | $d_0 = 20.000000$ | | |
| $r_1 =$ | 62.89429 (DOE) (aspheric surface) | $d_1 = 0.000000$ | $n_{d1} = 1001$ | $v_{d1} = -3.45$ |
| $r_2 =$ | 62.90322 | $d_2 = 4.000000$ | $n_{d2} = 1.5254$ | $v_{d2} = 56.25$ |
| $r_3 =$ | -44.06188 | $d_3 = 0.500000$ | | |
| $r_4 =$ | ∞ | $d_4 = 10.000000$ | $n_{d3} = 1.5254$ | $v_{d3} = 56.25$ |
| $r_5 =$ | ∞ (semitransparent surface) | $d_5 = -10.000000$ | $n_{d4} = 1.5254$ | $v_{d4} = 56.25$ |
| $r_6 =$ | 112.87621 (reflecting surface) | $d_6 = 20.000000$ | $n_{d5} = 1.5254$ | $v_{d5} = 56.25$. |
| $r_7 =$ | ∞ | $d_7 = 3.00$ | | |
| $r_{20} =$ | ∞ (display surface) | | | |

Asphrical Coefficients
1st surface $k = -1.000000$
$A = 0.495161 \times 10^{-6}$
$B = 0.180086 \times 10^{-9}$
$C = -0.101225 \times 10^{-11}$
$D = 0.322344 \times 10^{-14}$ Example 7
field of view: 34 × 25.5°

| | | | | |
|---|---|---|---|---|
| $r_0 =$ | ∞ (pupil) | $d_0 = 20.000000$ | | |
| $r_1 =$ | 43.97819 | $d_1 = 15.000000$ | $n_{d1} = 1.5254$ | $v_{d1} = 56.25$ |
| $r_2 =$ | ∞ (semitransparent surface) | $d_2 = -14.000000$ | $n_{d2} = 1.5254$ | $v_{d2} = 56.25$ |
| $r_3 =$ | 356.33121 | $d_3 = -0.500000$ | | |
| $r_4 =$ | -652937.0000 (DOE) (aspheric surface) | $d_4 = 0.000000$ | $n_{d3} = 1001$ | $v_{d3} = -3.45$ |
| $r_5 =$ | ∞ | $d_5 = -2.600000$ | $n_{d4} = 1.5254$ | $v_{d4} = 56.25$ |
| $r_6 =$ | 132.98513 (reflecting surface) | $d_6 = 2.600000$ | $n_{d5} = 1.5254$ | $v_{d5} = 56.25$ |
| $r_7 =$ | ∞ (DOE) | $d_7 = 0.000000$ | $n_{d6} = 1001$ | $v_{d6} = -3.45$ |
| $r_8 =$ | -652937.0000 (aspheric surface) | $d_8 = 0.500000$ | | |
| $r_9 =$ | 356.33121 | $d_9 = 25.000000$ | $n_{d7} = 1.5254$ | $v_{d7} = 56.25$ |
| $r_{10} =$ | ∞ | $d_{10} = 3.01$ | | |
| $r_{20} =$ | ∞ (display surface) | | | |

Asphrical Coefficients
4th & 8th surfaces $k = -1.000000$
$A = 0.274421 \times 10^{-8}$
$B = -0.141423 \times 10^{-10}$
$C = 0.572510 \times 10^{-13}$
$D = -0.831347 \times 10^{-16}$ Example 8
field of view: 44 × 33°

| | | | | |
|---|---|---|---|---|
| $r_0 =$ | ∞ (pupil) | $d_0 = 20.000000$ | | |
| $r_1 =$ | 75.87435 | $d_1 = 16.500000$ | $n_{d1} = 1.5254$ | $v_{d1} = 56.25$ |
| $r_2 =$ | ∞ (semitransparent surface) | $d_2 = -16.500000$ | $n_{d2} = 1.5254$ | $vd2 = 56.25$ |
| $r_3 =$ | 84.03475 | $d_3 = -0.500000$ | | |
| $r_4 =$ | -1251800.000 (DOE) (aspheric surface) | $d_4 = 0.000000$ | $n_{d3} = 1001$ | $v_{d3} = -3.45$ |
| $r_5 =$ | ∞ | $d_5 = -3.000000$ | $n_{d4} = 1.5254$ | $vd4 = 56.25$ |
| $r_6 =$ | 178.44375 (reflecting surface) | $d_6 = 3.000000$ | $n_{d5} = 1.5254$ | $v_{d5} = 56.25$ |
| $r_7 =$ | ∞ (DOE) | $d_7 = 0.000000$ | $n_{d6} = 1001$ | $vd6 = -3.45$ |
| $r_8 =$ | -1251800.000 (aspheric surface) | $d_8 = 0.500000$ | | |
| $r_9 =$ | 84.03475 | $d_9 = 28.000000$ | $n_{d7} = 1.5254$ | $v_{d7} = 56.25$ |
| $r_{10} =$ | ∞ (aspheric surface) | $d_{10} = 4.000$ | | |
| $r_{20} =$ | ∞ (display surface) | | | |

Asphrical Coefficients
4th & 8th surfaces $k = -1.000000$
$A = 0.179500 \times 10^{-9}$
$B = -0.448510 \times 10^{-12}$
$C = 0.735951 \times 10^{-15}$
$D = 0$ 10th surface $k = -1.000000$
$A = 0.220982 \times 10^{-4}$
$B = 0.739684 \times 10^{-7}$
$C = D = 0$ Example 9
field of view: 44 × 33°

| | | | | |
|---|---|---|---|---|
| $r_0 =$ | ∞ (pupil) | $d_0 = 20.000000$ | | |
| $r_1 =$ | 82.39535 | $d_1 = 4.000000$ | $n_{d1} = 1.5254$ | $v_{d1} = 56.25$ |
| $r_2 =$ | -432.46368 | $d_2 = 0.500000$ | | |

-continued

| | | | | |
|---|---|---|---|---|
| $r_3 =$ | ∞ | $d_3 = 16.000000$ | $n_{d2} = 1.5254$ | $v_{d2} = 56.25$ |
| $r_4 =$ | ∞ (semitransparent surface) | $d_4 = -16.500000$ | $n_{d3} = 1.5254$ | $v_{d3} = 56.25$ |
| $r_5 =$ | 88.04570 | $d_5 = -0.500000$ | | |
| $r_6 =$ | -1170100.000 (DOE) (aspheric surface) | $d_6 = 0.000000$ | $n_{d4} = 1001$ | $v_{d4} = -3.45$ |
| $r_7 =$ | ∞ | $d_7 = -3.000000$ | $n_{d5} = 1.5254$ | $v_{d5} = 56.25$ |
| $r_8 =$ | 187.64261 (reflecting surface) | $d_8 = 3.000000$ | $n_{d6} = 1.5254$ | $v_{d6} = 56.25$ |
| $r_9 =$ | ∞ (DOE) | $d_9 = 0.000000$ | $n_{d7} = 1001$ | $v_{d7} = -3.45$ |
| $r_{10} =$ | -1170100.000 (aspheric surface) | $d_{10} = 0.500000$ | | |
| $r_{11} =$ | 88.04570 | $d_{11} = 28.000000$ | $n_{d8} = 1.5254$ | $v_{d8} = 56.25$ |
| $r_{12} =$ | ∞ (aspheric surface) | $d_{12} = 3.984$ | | |
| $r_{20} =$ | ∞ (display surface) | | | |

Asphrical Coefficients
6th & 10th surfaces $k = -1.000000$
$A = 0.238088 \times 10^{-9}$
$B = -0.526503 \times 10^{-12}$
$C = 0.681039 \times 10^{-15}$
$D = 0$ 12th surface $k = -1.000000$
$A = 0.235167 \times 10^{-4}$
$B = 0.489255 \times 10^{-7}$
$C = D = 0$ Example 10
field of view: 44 × 33°

| | | | | |
|---|---|---|---|---|
| $r_0 =$ | ∞ (pupil) | $d_0 = 20.000000$ | | |
| $r_1 =$ | 70.09475 | $d_1 = 16.500000$ | $n_{d1} = 1.5254$ | $v_{d1} = 56.25$ |
| $r_2 =$ | ∞ (semitransparent surface) | $d_2 = -16.500000$ | $n_{d2} = 1.5254$ | $v_{d2} = 56.25$ |
| $r_3 =$ | 82.00225 (DOE) | $d_3 = 0.000000$ | $n_{d3} = 1001$ | $v_{d3} = -3.45$ |
| $r_4 =$ | 81.99634 (aspheric surface) | $d_4 = -0.500000$ | | |
| $r_5 =$ | 568.47977 | $d_5 = -3.000000$ | $n_{d4} = 1.5254$ | $v_{d4} = 56.25$ |
| $r_6 =$ | 173.58687 (reflecting surface) | $d_6 = 3.000000$ | $n_{d5} = 1.5254$ | $v_{d5} = 56.25$ |
| $r_7 =$ | 568.47977 | $d_7 = 0.500000$ | | |
| $r_8 =$ | 81.99634 (DOE) (aspheric surface) | $d_8 = 0.000000$ | $n_{d6} = 1001$ | $v_{d6} = -3.45$ |
| $r_9 =$ | 82.00225 | $d_9 = 28.000000$ | $n_{d7} = 1.5254$ | $v_{d7} = 56.25$ |
| $r_{10} =$ | ∞ (aspheric surface) | $d_{10} = 4.00$ | | |
| $r_{20} =$ | ∞ (display surface) | | | |

Asphrical Coefficients
4th & 8th surfaces $k = 0.000000$
$A = -0.349072 \times 10^{-9}$
$B = 0.956359 \times 10^{-12}$
$C = -0.142128 \times 10^{-14}$
$D = 0$ 10th surface $k = -1.000000$
$A = 0.136238 \times 10^{-4}$
$B = 0.826546 \times 10^{-7}$
$C = D = 0$ Example 11
field of view: 34 × 25.6°

| | | | | |
|---|---|---|---|---|
| $r_0 =$ | ∞ (pupil) | $d_0 = 20.000000$ | | |
| $r_1 =$ | 773781.74121 (DOE) (aspheric surface) | $d_1 = 0.000000$ | $n_{d1} = 1001$ | $v_{d1} = -3.45$ |
| $r_2 =$ | ∞ | $d_2 = 4.000000$ | $n_{d2} = 1.5254$ | $v_{d2} = 56.25$ |
| $r_3 =$ | -31.87344 | $d_3 = 24.000000$ | | |
| $r_4 =$ | -228.38756 (reflecting surface) | $d_4 = -12.000000$ | | |
| $r_5 =$ | ∞ (semitransparent surface) | $d5 = 11.000000$ | | |
| $r_{20} =$ | ∞ (display surface) | | | |

Asphrical Coefficients
1st surface $k = -1.000000$
$A = -0.763110 \times 10^{-9}$
$B = 0.112135 \times 10^{-11}$
$C = D = 0$ Example 12
field of view: 34 × 25.6°

| | | | | |
|---|---|---|---|---|
| $r_0 =$ | ∞ (pupil) | $d_0 = 20.000000$ | | |
| $r_1 =$ | 340.15056 | $d_1 = 4.000000$ | $n_{d1} = 1.5254$ | $v_{d1} = 56.25$ |
| $r_2 =$ | -37.52897 | $d_2 = 25.000000$ | | |
| $r_3 =$ | -199.63746 (DOE) (aspheric surface) | $d_3 = 0.000000$ | $n_{d2} = 1001$ | $v_{d2} = -3.45$ |
| $r_4 =$ | -199.58391 (reflecting surface) | $d_4 = -13.000000$ | | |
| $r_5 =$ | ∞ (semitransparent surface) | $d_5 = 12.000000$ | | |
| $r_{20} =$ | ∞ (display surface) | | | |

Asphrical Coefficients
3rd surface $k = -1.000000$
$A = -0.176327 \times 10^{-7}$
$B = 0.133317 \times 10^{-10}$
$C = -0.457458 \times 10^{-13}$
$D = 0.580075 \times 10^{-16}$ Example 13
field of view: 24 × 18°

| | | | | |
|---|---|---|---|---|
| $r_0 =$ | ∞ (pupil) | $d_0 = 20.000000$ | | |
| $r_1 =$ | 21.99560 | $d_1 = 19.000000$ | $n_{d1} = 1.5254$ | $v_{d1} = 56.25$ |
| $r_2 =$ | -104.64047 (DOE) (aspheric surface) | $d_2 = 0.000000$ | $n_{d2} = 1001$ | $v_{d2} = -3.45$ |
| $r_3 =$ | -104.58419 (reflecting surface) | $d_3 = -9.000000$ | $n_{d3} = 1.5254$ | $v_{d3} = 56.25$ |
| $r_4 =$ | ∞ (semitransparent surface) | $d_4 = 8.000000$ | $n_{d4} = 1.5254$ | $v_{d4} = 56.25$ |
| $r_5 =$ | ∞ | $d_5 = 3.04$ | | |
| $r_{20} =$ | ∞ (display surface) | | | |

Asphrical Coefficients
2nd surface $k = -1.000000$
$A = -0.124162 \times 10^{-6}$
$B = -0.129508 \times 10^{-10}$
$C = -0.315499 \times 10^{-12}$
$D = 0.151371 \times 10^{-14}$ Example 14
field of view: 40 × 30°

| | | | | |
|---|---|---|---|---|
| $r_0 =$ | ∞ (pupil) | $d_0 = 20.000000$ | | |
| $r_1 =$ | 43.51033 | $d_1 = 27.000000$ | $n_{d1} = 1.5254$ | $v_{d1} = 56.25$ |
| $r_2 =$ | -120.84016 (DOE) (aspheric surface) | $d_2 = 0.000000$ | $n_{d2} = 1001$ | $v_{d2} = -3.45$ |
| $r_3 =$ | -120.80362 (reflecting | $d_3 = -13.000000$ | $n_{d3} = 1.5254$ | $v_{d3} = 56.25$ |

| | | | | |
|---|---|---|---|---|
| | surface) | | | |
| $r_4 =$ | ∞ (semitransparent surface) | $d_4 = 12.000000$ | $n_{d4} = 1.5254$ | $v_{d4} = 56.25$ |
| $r_5 =$ | ∞ (aspheric surface) | $d_5 = 6.00$ | | |
| $r_{20} =$ | ∞ (display surface) | | | |

Asphrical Coefficients
2nd surface $k = -1.000000$
$A = -0.744292 \times 10^{-7}$
$B = 0.765828 \times 10^{-11}$
$C = -0.136963 \times 10^{-13}$
$D = 0$ 5th surface $k = -1.000000$
$A = -0.327713 \times 10^{-4}$
$B = 0.239321 \times 10^{-6}$
$C = D = 0$ Example 15
field of view: 30 × 22.6°

| | | | | |
|---|---|---|---|---|
| $r_0 =$ | ∞ (pupil) | $d_0 = 20.000000$ | | |
| $r_1 =$ | 39.89546 | $d_1 = 4.000000$ | $n_{d1} = 1.5254$ | $v_{d1} = 56.25$ |
| $r_2 =$ | −65.09032 | $d_2 = 0.500000$ | | |
| $r_3 =$ | ∞ | $d_3 = 20.000000$ | $n_{d2} = 1.5254$ | $v_{d2} = 56.25$ |
| $r_4 =$ | −120.00552 (DOE) (aspheric surface) | $d_4 = 0.000000$ | $n_{d3} = 1001$ | $v_{d3} = -3.45$ |
| $r_5 =$ | −119.95889 (reflecting surface) | $d_5 = -10.000000$ | $n_{d4} = 1.5254$ | $v_{d4} = 56.25$ |
| $r_6 =$ | ∞ (semitransparent surface) | $d_6 = 10.000000$ | $n_{d5} = 1.5254$ | $v_{d5} = 56.25$ |
| $r_7 =$ | ∞ (display surface) | $d_7 = 3.01$ | | |
| $r_{20} =$ | ∞ (display surface) | | | |

Asphrical Coefficients
4th surface $k = -1.000000$
$A = -0.760676 \times 10^{-7}$
$B = -0.180639 \times 10^{-11}$
$C = 0$
$D = -0.103948 \times 10^{-15}$ Example 16
field of view: 30 × 22.6°

| | | | | |
|---|---|---|---|---|
| $r_0 =$ | ∞ (pupil) | $d_0 = 20.000000$ | | |
| $r_1 =$ | 62.89429 (DOE) (aspheric surface) | $d_1 = 0.000000$ | $n_{d1} = 1001$ | $v_{d1} = -3.45$ |
| $r_2 =$ | 62.90322 | $d_2 = 4.000000$ | $n_{d2} = 1.5254$ | $v_{d2} = 56.25$ |
| $r_3 =$ | −44.06188 | $d_3 = 0.500000$ | | |
| $r_4 =$ | ∞ | $d_4 = 20.000000$ | $n_{d3} = 1.5254$ | $v_{d3} = 56.25$ |
| $r_5 =$ | −112.87621 (reflecting surface) | $d_5 = -10.000000$ | $n_{d4} = 1.5254$ | $v_{d4} = 56.25$ |
| $r_6 =$ | ∞ (semitransparent surface) | $d_6 = 10.000000$ | $n_{d5} = 1.5254$ | $v_{d5} = 56.25$ |
| $r_7 =$ | ∞ | $d_7 = 3.00$ | | |
| $r_{20} =$ | ∞ (display surface) | | | |

Asphrical Coefficients
1st surface $k = -1.000000$
$A = 0.495161 \times 10^{-6}$
$B = 0.180086 \times 10^{-9}$
$C = -0.101225 \times 10^{-11}$
$D = 0.322344 \times 10^{-14}$ Example 17
field of view: 34 × 25.5°

| | | | | |
|---|---|---|---|---|
| $r_0 =$ | ∞ (pupil) | $d_0 = 20.000000$ | | |
| $r_1 =$ | 43.97819 | $d_1 = 29.000000$ | $n_{d1} = 1.5254$ | $vd1 = 56.25$ |
| $r_2 =$ | −356.33121 | $d_2 = 0.500000$ | | |
| $r_3 =$ | 652937.23077 (DOE) (aspheric surface) | $d_3 = 0.000000$ | $n_{d2} = 1001$ | $v_{d2} = -3.45$ |
| $r_4 =$ | ∞ | $d_4 = 2.600000$ | $n_{d3} = 1.5254$ | $v_{d3} = 56.25$ |
| $r_5 =$ | −132.98513 (reflecting surface) | $d_5 = -2.600000$ | $n_{d4} = 1.5254$ | $v_{d4} = 56.25$ |
| $r_6 =$ | ∞ (DOE) | $d_6 = 0.000000$ | $n_{d5} = 1001$ | $v_{d5} = -3.45$ |
| $r_7 =$ | 652937.23077 (aspheric surface) | $d_7 = -0.500000$ | | |
| $r_8 =$ | −356.33121 | $d_8 = -14.000000$ | $n_{d6} = 1.5254$ | $v_{d6} = 56.25$ |
| $r_9 =$ | ∞ (semitransparent surface) | $d_9 = 11.000000$ | $n_{d7} = 1.5254$ | $v_{d7} = 56.25$ |
| $r_{10} =$ | ∞ | $d_{10} = 3.01$ | | |
| $r_{20} =$ | ∞ (display surface) | | | |

Asphrical Coefficients
3rd & 7th surfaces $k = -1.000000$
$A = -0.274421 \times 10^{-8}$
$B = 0.141423 \times 10^{-10}$
$C = -0.572510 \times 10^{-13}$
$D = 0.831347 \times 10^{-16}$ Example 18
field of view: 44 × 33°

| | | | | |
|---|---|---|---|---|
| $r_0 =$ | ∞ (pupil) | $d_0 = 20.000000$ | | |
| $r_1 =$ | 54.73019 | $d_1 = 32.000000$ | $n_{d1} = 1.5254$ | $v_{d1} = 56.25$ |
| $r_2 =$ | −126.01373 | $d_2 = 0.500000$ | | |
| $r_3 =$ | 582347.91693 (DOE) (aspheric surface) | $d_3 = 0.000000$ | $n_{d2} = 1001$ | $v_{d2} = -3.45$ |
| $r_4 =$ | ∞ | $d_4 = 3.000000$ | $n_{d3} = 1.5254$ | $v_{d3} = 56.25$ |
| $r_5 =$ | −209.15616 (reflecting surface) | $d_5 = -3.000000$ | $n_{d4} = 1.5254$ | $v_{d4} = 56.25$ |
| $r_6 =$ | ∞ (DOE) | $d_6 = 0.000000$ | $n_{d5} = 1001$ | $v_{d5} = -3.45$ |
| $r_7 =$ | 582347.91693 (aspheric surface) | $d_7 = -0.500000$ | | |
| $r_8 =$ | −126.01373 | $d_8 = -15.000000$ | $n_{d6} = 1.5254$ | $v_{d6} = 56.25$ |
| $r_9 =$ | ∞ (semitransparent surface) | $d_9 = 15.000000$ | $n_{d7} = 1.5254$ | $v_{d7} = 56.25$ |
| $r_{10} =$ | ∞ (aspheric surface) | $d_{10} = 3.000$ | | |
| $r_{20} =$ | ∞ (display surface) | | | |

Asphrical Coefficients
3rd & 7th surfaces $k = -1.000000$
$A = -0.166031 \times 10^{-8}$
$B = 0.300191 \times 10^{-11}$
$C = -0.286505 \times 10^{-14}$
$D = 0$ 10th surface $k = -1.000000$
$A = -0.146847 \times 10^{-4}$
$B = 0.102104 \times 10^{-6}$
$C = D = 0$ Example 19
field of view: 44 × 33°

| | | | | |
|---|---|---|---|---|
| $r_0 =$ | ∞ (pupil) | $d_0 = 20.000000$ | | |
| $r_1 =$ | 79.79999 | $d_1 = 4.000000$ | $n_{d1} = 1.5254$ | $v_{d1} = 56.25$ |
| $r_2 =$ | 742.84061 | $d_2 = 0.500000$ | | |
| $r_3 =$ | ∞ | $d_3 = 32.500000$ | $n_{d2} = 1.5254$ | $v_{d2} = 56.25$ |
| $r_4 =$ | −86.60547 | $d_4 = 0.500000$ | | |
| $r_5 =$ | 1270400.0000 | $d_5 = 0.000000$ | $n_{d3} = 1001$ | $v_{d3} = -3.45$ |

-continued

| | (DOE) (aspheric surface) | | | |
|---|---|---|---|---|
| $r_6 =$ | ∞ | $d_6 = 3.000000$ | $n_{d4} = 1.5254$ | $v_{d4} = 56.25$ |
| $r_7 =$ | −198.13591 (reflecting surface) | $d_7 = -3.000000$ | $n_{d5} = 1.5254$ | $v_{d5} = 56.25$ |
| $r_8 =$ | ∞ (DOE) | $d_8 = 0.000000$ | $n_{d6} = 1001$ | $v_{d6} = -3.45$ |
| $r_9 =$ | 1270400.0000 (aspheric surface) | $d_9 = -0.500000$ | | |
| $r_{10} =$ | −86.60547 | $d_{10} = -16.500000$ | $n_{d7} = 1.5254$ | $v_{d7} = 56.25$ |
| $r_{11} =$ | ∞ (semitransparent surface) | $d_{11} = 15.000000$ | $n_{d8} = 1.5254$ | $v_{d8} = 56.25$ |
| $r_{12} =$ | ∞ (aspheric surface) | $d_{12} = 4.000000$ | | |
| $r_{20} =$ | ∞ (display surface) | | | |

Asphrical Coefficients
5th & 9th surfaces $k = -1.000000$
$A = -0.268430 \times 10^{-9}$
$B = 0.518185 \times 10^{-12}$
$C = -0.539659 \times 10^{-15}$
$D = 0$ 12th surface $k = -1.000000$
$A = 0.132600 \times 10^{-4}$
$B = 0.544729 \times 10^{-7}$
$C = D = 0$ Example 20
field of view: 44 × 33°

| | | | | |
|---|---|---|---|---|
| $r_0 =$ | ∞ (pupil) | $d_0 = 20.000000$ | | |
| $r_1 =$ | 78.81862 | $d1 = 33.000000$ | $n_{d1} = 1.5254$ | $v_{d1} = 56.25$ |
| $r_2 =$ | −73.11829 (DOE) | $d_2\ 0.000000$ | $n_{d2} = 1001$ | $v_{d2} = -3.45$ |
| $r_3 =$ | −73.11389 (aspheric surface) | $d_3 = 0.500000$ | | |
| $r_4 =$ | −292.23283 | $d_4 = 3.000000$ | $n_{d3} = 1.5254$ | $v_{d3} = 56.25$ |
| $r_5 =$ | −182.26137 (reflecting surface) | $d_5 = -3.000000$ | $n_{d4} = 1.5254$ | $v_{d4} = 56.25$ |
| $r_6 =$ | −292.23283 | $d_6 = -0.500000$ | | |
| $r_7 =$ | −73.11389 (DOE) (aspheric surface) | $d_7 = -0.500600$ | $n_{d5} = 1001$ | $v_{d5} = -3.45$ |
| $r_8 =$ | −73.11829 | $d_8 = -16.500000$ | $n_{d6} = 1.5254$ | $v_{d6} = 56.25$ |
| $r_9 =$ | ∞ (semitransparent surface) | $d_9 = 14.000000$ | $n_{d7} = 1.5254$ | $v_{d7} = 56.25$ |
| $r_{10} =$ | ∞ (aspheric surface) | $d_{10} = 4.000000$ | | |
| $r_{20} =$ | ∞ (display surface) | | | |

Figure 37:
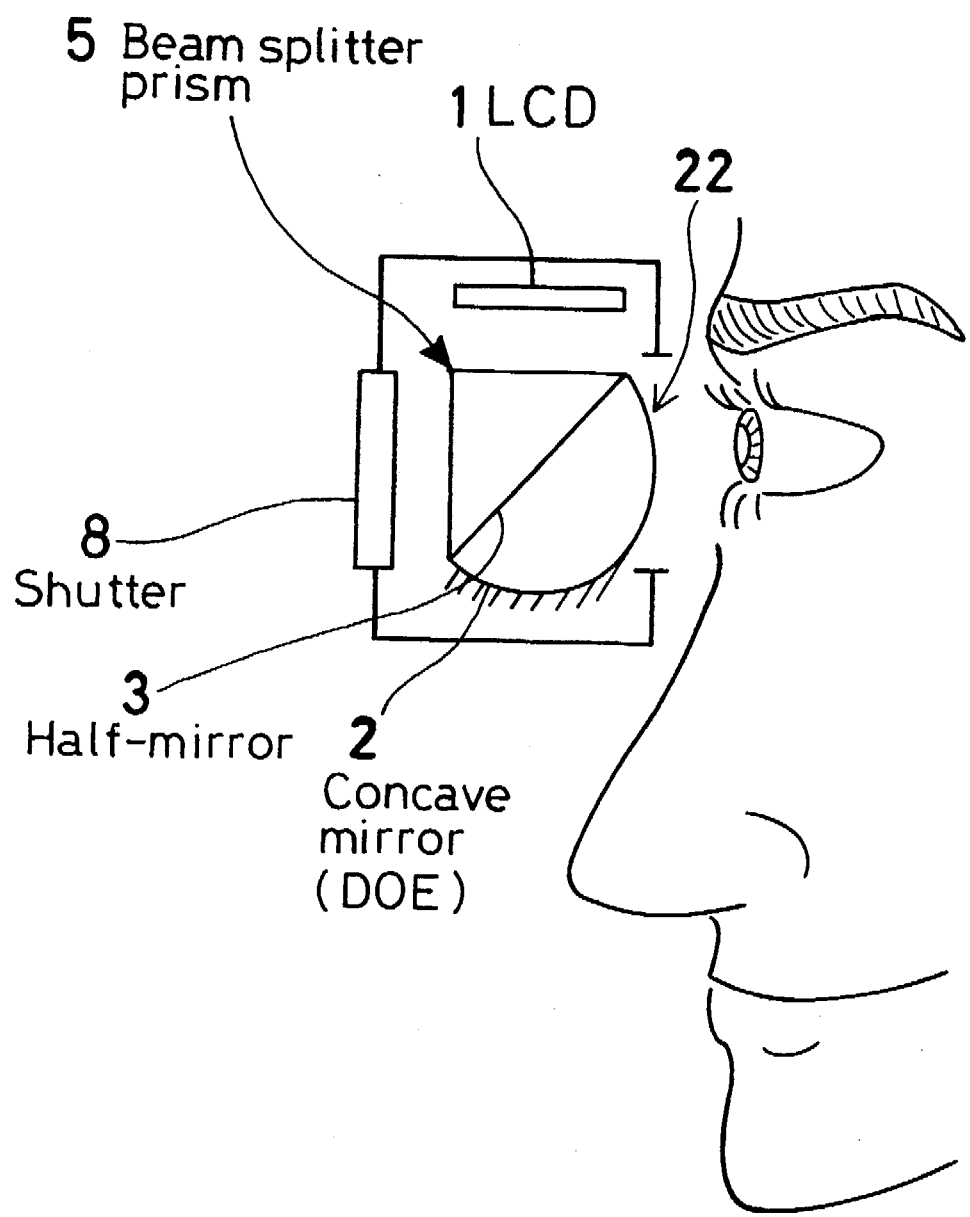
FIG. 37 is a sectional view showing one example of an optical arrangement for use in a see-through type head-mounted image display apparatus.

Asphrical Coefficients
3rd & 7th surfaces $k = 0.000000$
$A = 0.556292 \times 10^{-9}$
$B = -0.161340 \times 10^{-11}$
$C = 0.178046 \times 10^{-14}$
$D = 0$ 10th surface $k = -1.000000$
$A = 0.177330 \times 10^{-5}$
$B = 0.896054 \times 10^{-7}$
$C = D = 0$ Incidentally, the optical system having the above-described optical arrangement may be used in a see-through type head-mounted image display apparatus. FIG. 37 shows one example of the optical arrangement for the observer's left eye of such an image display apparatus. It should be noted that a pair of optical systems arranged as shown in FIG. 37 are disposed for the observer's left and right eyes. FIG. 37 shows an arrangement that employs the optical system in the third example (see FIG. 6), in which a liquid crystal display device (LCD) is used as the image display device I. A shutter 8, which is formed from a liquid crystal optical element, for example, is disposed in front of the beam splitter prism 5. An image (electronic image) displayed on the LCD 1 is reflected and diffracted by the concave mirror provided on the DOE 20, reflected by the half-mirror 3 of the beam splitter prism 5, and led to the eyeball as an aerial enlarged image. When the shutter 8 is open, a scene or other image in the outside world passes through the half-mirror 3 and is combined with the image displayed on the LCD 1 for observation. Alternatively, the outside world image alone is observed with the display of the electronic image turned off.

Figure 38:
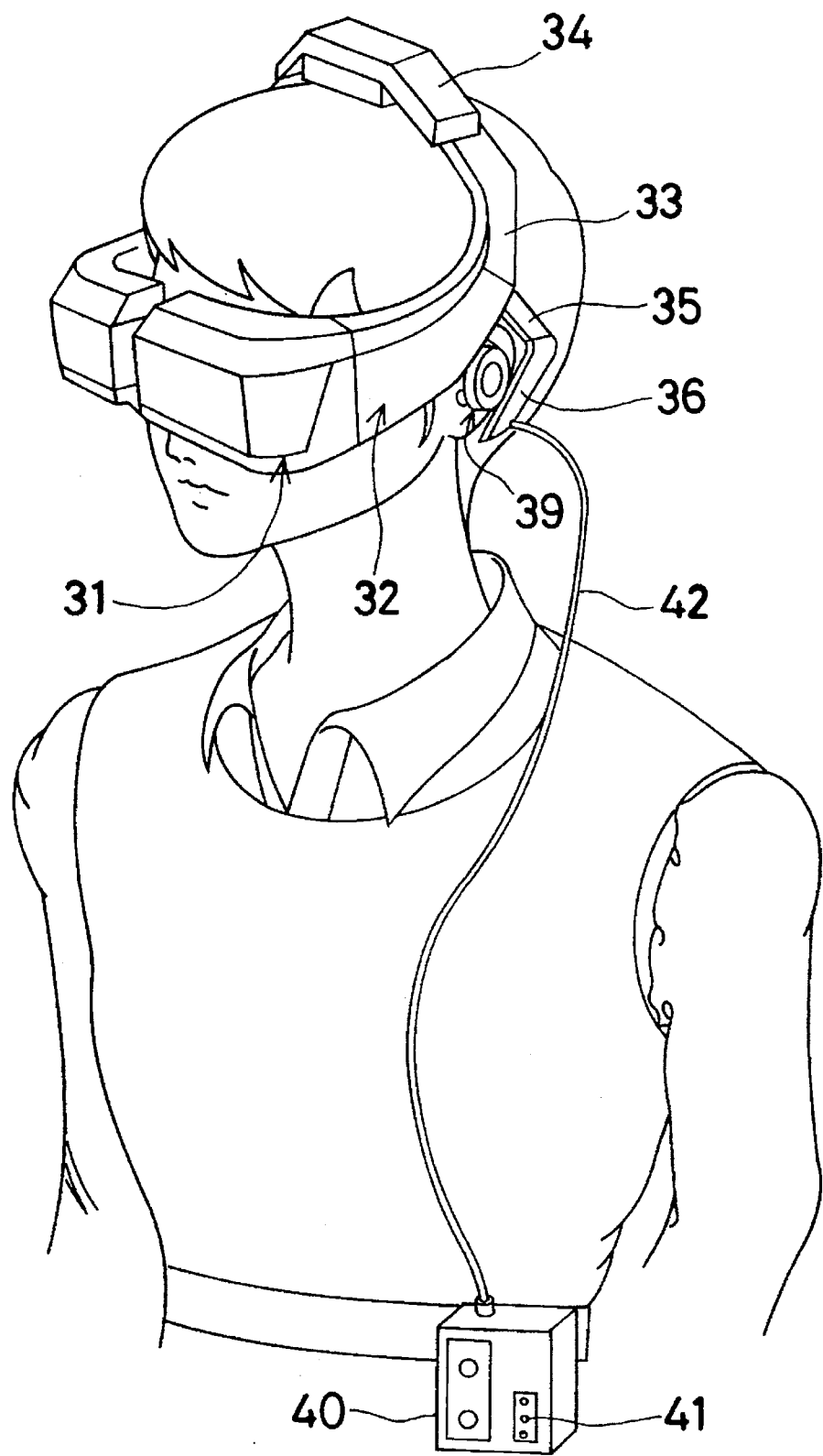
FIG. 38 shows one example in which the image display apparatus of the present invention is arranged as a head-mounted image display apparatus.
Figure 39:
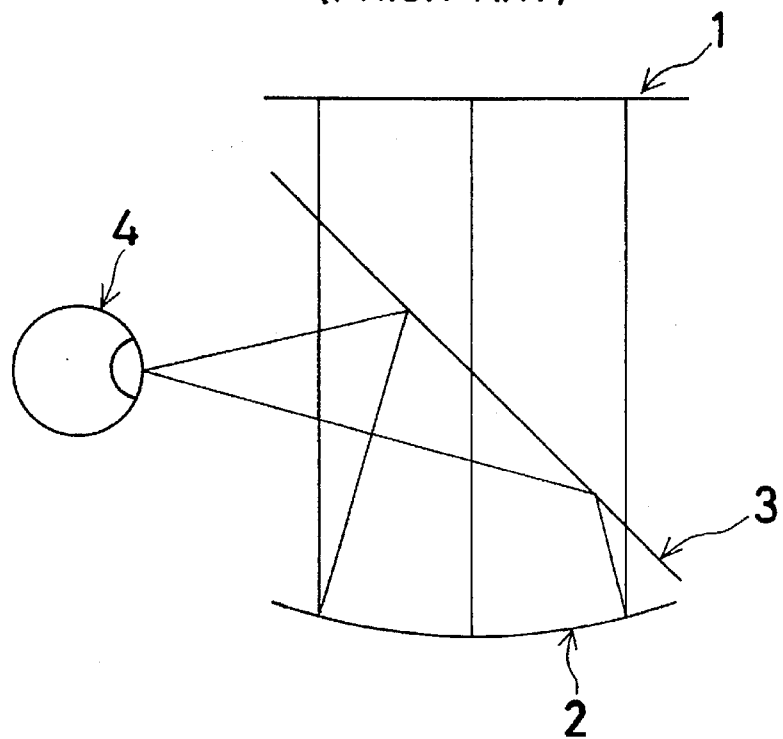
FIG. 39 is a sectional view showing one example of the optical system of a conventional image display apparatus.
Figure 40:
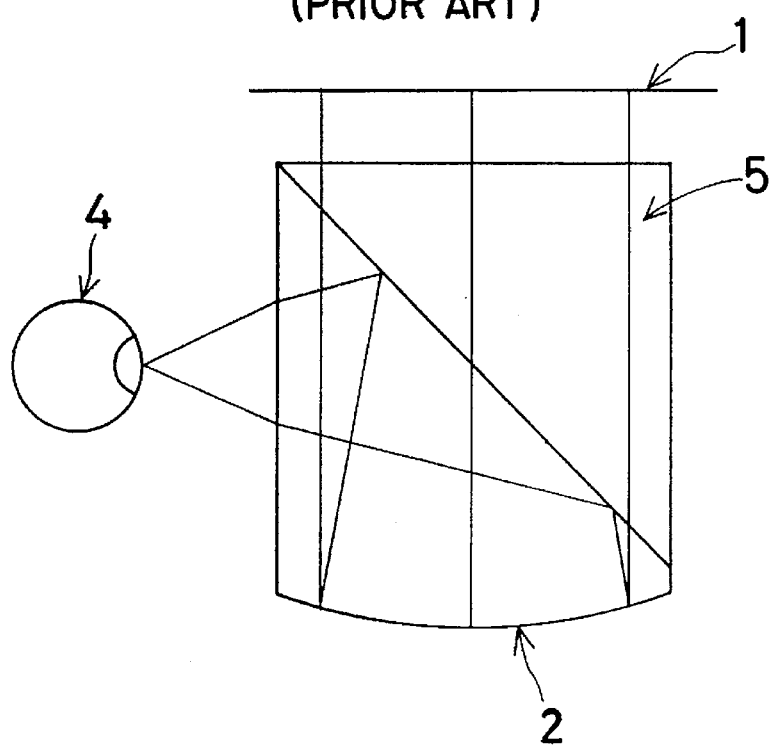
FIG. 40 is a sectional view showing the optical system of another conventional image display apparatus.
Figure 41:
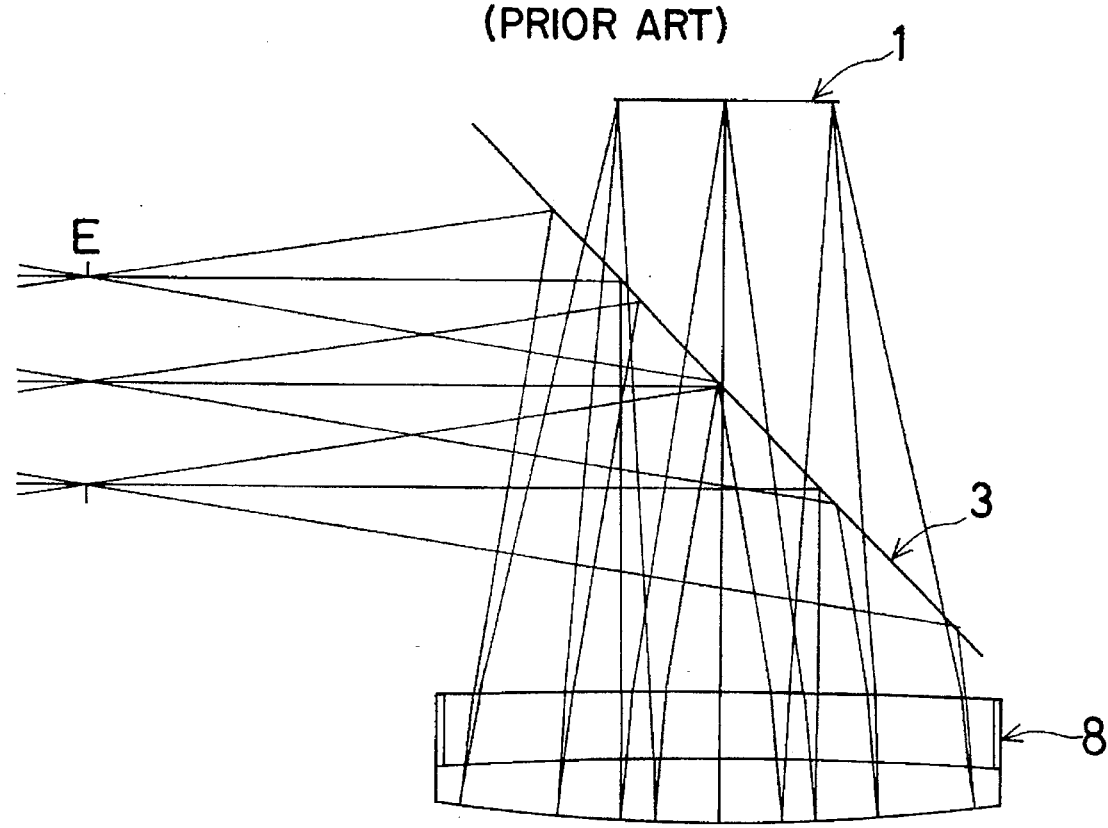
FIG. 41 is a sectional view showing the optical system of a conventional image display apparatus arranged to provide a wide field of view.

The display apparatus body having a pair of optical systems arranged as described above for the observer's left and right eyes is formed as a head-mounted image display apparatus as shown, for example, in FIG. 38. Reference numeral 31 in FIG. 38 denotes a display apparatus body unit. The apparatus body unit 31 has a support member which is secured to the observer's head so that the apparatus body unit 31 is retained on the observer's face. The support member is composed of a pair of left and right front frames 32 which are joined to the apparatus body unit 31 at one end thereof and which extend from the observer's temples to regions above the ears, and a pair of left and right rear frames 33 which are joined to the other ends of the front frames 32 and which extend over the observer's left and right temporal regions, respectively. The support member further includes a top frame 34 which is jointed at both ends thereof to the other ends of the left and right rear frames 33 so that the top frame 34 is held between the rear frames 33 to rest on the top of the observer's head.

In addition, a rear plate 35, which is formed from an elastic material, e.g., a metallic leaf spring, is joined to a portion of each front frame 32 near the joint with the associated rear frame 33. A rear cover 36 which constitutes a part of the support member is joined to the rear plate 35 so that the rear cover 36 can lie behind the ear in a region extending from the back part of the observer's head to the base of the observer's neck to support the apparatus body unit 31.

A cable 42 for transmitting an image, sound or other signal from the outside extends through the top frame 34, the rear frames 33, the front frames 32 and the rear plate 35 and projects to the outside from the rear end of the rear cover 36. The cable 42 is connected to a video reproducing unit 40. It should be noted that reference numeral 41 denotes a switch and volume control part of the video reproducing unit 40.

The cable 42 may have a jack and plug arrangement attached to the distal end thereof so that the cable 42 can be detachably connected to an existing video deck. The cable 42 may also be connected to a TV signal receiving tuner so as to enable the user to enjoy watching TV. Alternatively, the cable 42 may be connected to a computer to receive computer graphic images or message images or the like from the computer. To eliminate the bothersome cord, the head-mounted image display apparatus may be arranged to receive external radio signals through an antenna connected thereto.

As has been described above, the arrangement of the present invention makes it possible to obtain a compact, lightweight and wide-field head-mounted image display apparatus which is effectively corrected for chromatic aberration.

What we claim is:

1. An image display apparatus comprising:

image display means for displaying an image; and a projection optical system for leading said image to an observation region, said projection optical system including:

a reflecting and transmitting member having reflecting and transmitting functions disposed on an optical path of said image display means, a reflecting member disposed so as to form a turn-back optical path between said reflecting member and said reflecting and transmitting member, a refractive member having refractive power, said refractive member being arranged to produce at least positive chromatic aberration, and a diffraction optical element arranged to produce at least negative chromatic aberration, at least one of said refractive member and said diffraction optical element being disposed in an optical path between said reflecting and transmitting member and said observation region.

2. An image display apparatus comprising:

image display means for displaying an image; and a projection optical system for leading said image to an observation region, said projection optical system including:

a reflecting and transmitting member having reflecting and transmitting functions disposed on an optical path of said image display means, a reflecting member disposed so as to form a turn-back optical path between said reflecting member and said reflecting and transmitting member, and a combination element disposed in an optical path between said reflecting and transmitting member and said observation region, said combination element comprising:

a refractive member having refractive power, said refractive member being arranged to produce at least positive chromatic aberration, and a diffraction optical element arranged to produce at least negative chromatic aberration.

3. An image display apparatus according to claim 1 or 2, wherein:

said refractive member and said diffraction optical element are formed so that at least a part of chromatic aberration produced by one of said refractive member and said diffraction optical element is cancelled by the other of said refractive member and said diffraction optical element.

4. An image display apparatus according to claim 1 or 2, wherein:

said refractive member is one of a refracting surface of positive power and a positive refracting lens, and said diffraction optical element has positive power and is disposed between said reflecting and transmitting member and said reflecting member.

5. An image display apparatus according to claim 1 or 2, wherein:

said diffraction optical element has positive power as a whole; and said refractive member and said diffraction optical element are disposed between an eyeball of said user and said reflecting and transmitting member.

6. An image display apparatus according to claim 1 or 2, wherein:

said diffraction optical element has positive power and is disposed between an eyeball of said user and said reflecting and transmitting member; and said refractive member is one of a refracting surface of positive power and a positive refracting lens and is disposed between said reflecting and transmitting member and said reflecting member.

7. An image display apparatus according to claim 1 or 2, wherein:

said diffraction optical element is a hybrid element having a combination of a refracting optical component and a diffraction optical element component, which are integrated with each other.

8. An image display apparatus according to claim 7, wherein:

said hybrid element is made of a plastic material.

9. An image display apparatus according to claim 7, wherein:

said hybrid element includes at least a doublet lens.

10. An image display apparatus according to claim 1 or 2, wherein:

said diffraction optical element is a reflective diffraction optical element having a diffraction surface formed on a surface of said reflecting member.

11. An image display apparatus according to claim 1 or 2, wherein:

said diffraction optical element has an aspherical action of pitch distribution such that a power of said diffraction optical element becomes weaker than a power of a paraxial spherical system, as a distance from an optical axis through said diffraction optical element increases.

12. An image display apparatus according to claim 1 or 2, wherein:

said reflecting member is a concave reflecting mirror.

13. An image display apparatus according to claim 1 or 2, wherein:

said reflecting and transmitting member is a prism having a semitransparent reflecting surface.

14. An image display apparatus according to claim 13, wherein:

said prism is a plastic prism.

15. An image display apparatus according to claim 13, wherein:

an end surface of said prism on a side thereof which faces said image display means is an aspherical surface.

16. An image display apparatus according to claim 13, wherein said projection optical system further comprises:

an aspherical lens disposed between said image display means and said prism.

17. In an image display apparatus comprising means for displaying an image, and a projection optical system for leading said image to an observation region, said projection optical system including:

a member having reflecting and transmitting functions disposed on an optical path of said image display means as optical axis bending means;

a reflecting member disposed so as to form a turn-back optical path between it and said member having reflecting and transmitting functions;

a member having refractive power; and a diffraction optical element;

at least either said member having refractive power or said diffraction optical element being disposed in an optical path between said member having reflecting and transmitting functions and said observation region, which includes said turn-back optical path;

said image display apparatus satisfying the following condition:

$$0.033 < \Sigma(f/f_{DOE}) < 0.19 \quad (1)$$

where f is the focal length of the entire optical system for light of a given order of diffraction, $f_{DOE}$ is the focal length of said diffraction optical element for the light of a given order of diffraction, and $\Sigma$ means summation carried out in a case where there are a plurality of diffraction optical elements.

18. In an image display apparatus comprising means for displaying an image, and a projection optical system for leading said image to an observation region, said projection optical system including:

a member having reflecting and transmitting functions disposed on an optical path of said image display means as optical axis bending means;

a reflecting member disposed so as to form a turn-back optical path between it and said member having reflecting and transmitting functions; and a combination of a member having refractive power and a diffraction optical element, which are disposed in an optical path between said member having reflecting and transmitting functions and said observation region, which includes said turn-back optical path;

said image display apparatus satisfying the following condition:

$$0.033 < \Sigma(f/f_{DOE}) < 0.19 \quad (1)$$

where f is the focal length of the entire optical system for light of a given order of diffraction, $f_{DOE}$ is the focal length of said diffraction optical element for the light of a given order of diffraction, and $\Sigma$ means summation carried out in a case where there are a plurality of diffraction optical elements.

19. In an image display apparatus comprising means for displaying an image, and a projection optical system for leading said image to an observation region, said projection optical system including:

a member having reflecting and transmitting functions disposed on an optical path of said image display means as optical axis bending means;

a reflecting member disposed so as to form a turn-back optical path between it and said member having reflecting and transmitting functions;

a member having refractive power; and a diffraction optical element;

at least either said member having refractive power or said diffraction optical element being disposed in an optical path between said member having reflecting and transmitting functions and said observation region, which includes said turn-back optical path;

said image display apparatus satisfying the following condition:

$$15 < f < 60 \quad (2)$$

where f is the focal length of the entire optical system for light of a given order of diffraction.

20. In an image display apparatus comprising means for displaying an image, and a projection optical system for leading said image to an observation region, said projection optical system including:

a member having reflecting and transmitting functions disposed on an optical path of said image display means as optical axis bending means;

a reflecting member disposed so as to form a turn-back optical path between it and said member having reflecting and transmitting functions; and a combination of a member having refractive power and a diffraction optical element, which are disposed in an optical path between said member having reflecting and transmitting functions and said observation region, which includes said turn-back optical path;

said image display apparatus satisfying the following condition:

$$15 < f < 60 \quad (2)$$

where f is the focal length of the entire optical system for light of a given order of diffraction.

* * * * *